United States Patent
Nixon

(10) Patent No.: US 11,586,615 B2
(45) Date of Patent: Feb. 21, 2023

(54) SYSTEM FOR GENERATION OF RESOURCE IDENTIFICATION NUMBERS TO AVOID ELECTRONIC MISREADS

(71) Applicant: BANK OF AMERICA CORPORATION, Charlotte, NC (US)

(72) Inventor: Melvin Gregory Nixon, Lake Wylie, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 119 days.

(21) Appl. No.: 16/941,669

(22) Filed: Jul. 29, 2020

(65) Prior Publication Data

US 2022/0035793 A1 Feb. 3, 2022

(51) Int. Cl.
*G06F 16/23* (2019.01)
*G06F 16/903* (2019.01)
(Continued)

(52) U.S. Cl.
CPC ...... *G06F 16/2379* (2019.01); *G06F 16/2365* (2019.01); *G06F 16/24558* (2019.01);
(Continued)

(58) Field of Classification Search
CPC ............. G06F 16/2379; G06F 16/2365; G06F 16/24558; G06F 16/90344;
(Continued)

(56) References Cited

U.S. PATENT DOCUMENTS

| 8,787,652 B1 * | 7/2014 | Jones ................... G07D 7/0047 382/135 |
| 10,885,102 B1 * | 1/2021 | Arora ................... G06T 1/0007 |

(Continued)

FOREIGN PATENT DOCUMENTS

| CN | 110008385 B | * 12/2020 |
| CN | 108984695 B | * 4/2021 |

(Continued)

OTHER PUBLICATIONS

Xin et al., "An Automatic Location and Recognition Method for Bank Card Number" RICAI 2019: Proceedings of the 2019 International Conference on Robotics, Intelligent Control and Artificial Intelligence Sep. 2019, pp. 728-732https://doi.org/10.1145/3366194.3366325 (Year: 2019).*

*Primary Examiner* — Mark D Featherstone
*Assistant Examiner* — Kweku William Halm
(74) *Attorney, Agent, or Firm* — Moore & Van Allen PLLC; Nicholas C. Russell

(57) ABSTRACT

Embodiments of the invention are directed to a system, method, or computer program product structured for generating resource identification strings to avoid electronic misreads. In some embodiments, the system is structured for generating a new technology resource string of characters, comparing the new string to existing technology resource strings, and determining whether the new string is the same as an existing string. The system is also structured for, in response to determining it is not, for each existing string, pairing characters of the strings and determining whether the strings have at least a threshold number of matching character pairs; if there are, for at least one of the existing strings, determining whether characters of the non-matching pairs are commonly misread characters and determining whether there are a threshold combination of matching/commonly misread pairs; and if there are, discard the new string and generate a second new technology resource string.

18 Claims, 7 Drawing Sheets

(51) Int. Cl.
*G06F 16/2455* (2019.01)
*G06V 10/10* (2022.01)
*G06V 10/20* (2022.01)
*G06V 10/98* (2022.01)
*G06V 30/194* (2022.01)
*G06V 30/418* (2022.01)
*G06K 9/62* (2022.01)
*G06N 20/00* (2019.01)
*G06V 30/10* (2022.01)

(52) U.S. Cl.
CPC ........ *G06F 16/90344* (2019.01); *G06V 10/10* (2022.01); *G06V 10/20* (2022.01); *G06V 10/993* (2022.01); *G06V 30/194* (2022.01); *G06V 30/418* (2022.01); *G06K 9/6227* (2013.01); *G06N 20/00* (2019.01); *G06V 30/10* (2022.01)

(58) Field of Classification Search
CPC ...... G06K 9/00483; G06K 9/036; G06K 9/20; G06K 9/66; G06K 9/78; G06K 9/80; G06K 9/6227; G06K 2209/01; G06N 20/00
See application file for complete search history.

(56) References Cited

U.S. PATENT DOCUMENTS

| | | | |
|---|---|---|---|
| 11,100,572 B1* | 8/2021 | Hecht | G06K 9/00456 |
| 2004/0217170 A1* | 11/2004 | Takiguchi | G06K 7/084 |
| | | | 235/449 |
| 2006/0210138 A1* | 9/2006 | Hilton | G07D 7/0043 |
| | | | 382/137 |
| 2006/0219773 A1* | 10/2006 | Richardson | G07F 19/00 |
| | | | 235/379 |
| 2007/0217669 A1* | 9/2007 | Swift | G06Q 20/042 |
| | | | 382/139 |
| 2009/0171955 A1* | 7/2009 | Merz | G06F 16/24558 |
| 2015/0006360 A1* | 1/2015 | Kumar | G06K 9/03 |
| | | | 705/39 |
| 2015/0081493 A1* | 3/2015 | Johnson | G06Q 20/042 |
| | | | 705/35 |
| 2015/0269562 A1* | 9/2015 | Wang | G06Q 20/354 |
| | | | 705/41 |
| 2018/0150956 A1* | 5/2018 | Kao | G06V 10/82 |
| 2021/0182803 A1* | 6/2021 | Mintz | G06Q 20/4016 |

FOREIGN PATENT DOCUMENTS

| | | | |
|---|---|---|---|
| EP | 0518496 A2 * | 12/1992 | G06F 40/232 |
| GB | 2583894 A * | 11/2020 | G06Q 20/382 |

* cited by examiner

ND STATES PATENT

SYSTEM FOR GENERATION OF RESOURCE IDENTIFICATION NUMBERS TO AVOID ELECTRONIC MISREADS

BACKGROUND

An entity may receive images, scans, or other electronic documents that contain a series or string of characters representing a technology resource that a user holds at the entity. To identify the technology resource, the entity may electronically extract the series of characters from the image, scan, or other electronic document. However, in some cases, the extraction process may misidentify one or more of the characters in the character string as different characters. As such, there is a need for a system that allows for the generation of new character strings, as well as the evaluation of existing character strings, in such a way so as to avoid electronic misreads.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing systems, computer program products, and methods for synthesizing and building infrastructure platforms. In some instances, a system comprises: a memory device with computer-readable program code stored thereon; a communication device; and a processing device operatively coupled to the memory device and communication device, wherein the processing device is configured to receive a request for a new technology resource; generate a new technology resource string of characters, each character having a position in the new technology resource string; compare the new technology resource string to a plurality of existing technology resource strings, each existing technology resource string comprising a string of characters, each character having a position in the existing technology resource string, wherein each existing technology resource string is associated with an existing technology resource; determine whether the new technology resource string is the same as an existing technology resource string; in response to determining that the new technology resource string is not the same as any existing technology resource string, for each existing technology resource string: pair each character of the new technology resource string with a character in a corresponding position in the existing technology resource string, determine whether the characters of each pair match, and determine whether the new technology resource string has at least a threshold number of matching character pairs with the existing technology resource string; in response to determining that the new technology resource string has at least a threshold number of matching character pairs with one or more existing technology resource strings, for at least one of the one or more existing technology resource strings: for each non-matching pair of characters between the new technology resource string and the existing technology resource string, determine whether the characters of the non-matching pair are commonly misread characters, and determine whether the new technology resource string has at least a threshold combination of matching character pairs and commonly misread character pairs with the existing technology resource string; and in response to determining that the new technology resource string has at least a threshold combination of matching character pairs and commonly misread character pairs with an existing technology resource string, discard the new technology resource string and generate a second new technology resource string of characters.

In some embodiments, a pair of commonly misread characters comprises two characters with a likelihood of being mistaken for each other during an optical character recognition process.

In some embodiments, or in combination with any of the previous embodiments, generating the new technology resource string comprises generating a random string of numbers, the string having a predetermined number of digits.

In some embodiments, or in combination with any of the previous embodiments, determining whether the new technology resource string has at least a threshold combination of matching character pairs and commonly misread character pairs with the existing technology resource string comprises determining a number of matching character pairs between the new technology resource string and the existing technology resource string; determining a number of commonly misread character pairs between the new technology resource string and the existing technology resource string; weighting the number of matching character pairs and weighting the number of commonly misread alphanumeric character pairs; and determining whether a combination of the weighted number of matching character pairs and the weighted number of commonly misread character pairs reaches the threshold combination.

In some embodiments, or in combination with any of the previous embodiments, the invention is further configured to compare the second new technology resource string to the plurality of existing technology resource strings; determine whether the second new technology resource string is the same as an existing technology resource string; in response to determining that the second new technology resource string is not the same as any technology resource string, for each existing technology resource string: pair each character of the second new technology resource string with a character in a corresponding position in the existing technology resource string, determine whether the characters of each pair match, and determine whether the new technology resource string has at least a threshold number of matching character pairs with the existing technology resource string; in response to determining that the second new technology resource string has at least a threshold number of matching character pairs with one or more existing technology resource strings, for at least one of the existing technology resource strings: for each non-matching pair of characters between the second new technology resource string and the existing technology resource string, determine whether the characters of the non-matching pair are commonly misread characters, and determine whether the second new technology resource string has at least the threshold combination of matching character pairs and commonly misread character pairs with the existing technology resource string; and in response to determining that the second new technology resource string does not have the threshold combination of matching character pairs and commonly misread character pairs with any existing technology resource string, set the second new technology resource string as a final technology resource string for the new technology resource.

In some embodiments, or in combination with any of the previous embodiments, the invention is further configured to identify a given existing technology resource string from the plurality of existing technology resource strings; for each remaining existing technology resource string: pair each character of the given existing technology resource string with a character in a corresponding position in the existing technology resource string, determine whether the characters of each pair match, and determine whether the given existing technology resource string has at least a threshold number of matching character pairs with the existing technology resource string; and in response to determining that the given existing technology resource string has at least a threshold number of matching character pairs with one or more remaining existing technology resource strings, for each of the one or more remaining existing technology resource strings: for each non-matching pair of characters between the given existing technology resource string and the remaining existing technology resource string, determine whether the characters of the non-matching pair are commonly misread characters, and determine whether the given existing technology resource string has at least a threshold combination of matching character pairs and commonly misread character pairs with the remaining existing technology resource string; and in response to determining that the given existing technology resource string has at least a threshold combination of matching character pairs and commonly misread character pairs with one or more existing technology resource strings, flag the technology resource associated with the given existing technology resource string.

In some embodiments, or in combination with any of the previous embodiments, identifying the given existing technology resource string from the plurality of existing technology resource strings comprises identifying the given existing technology resource string as a next existing technology resource string on a list comprising the plurality of existing technology resource strings; wherein existing technology resource strings listed before the given existing technology resource string have already been subject to a determination of whether to be flagged.

In some embodiments, or in combination with any of the previous embodiments, flagging the technology resource associated with the given existing technology resource string comprises requiring at least one of manual entry of the given existing technology resource string or requiring manual review of optical character recognition that produces the given existing technology resource string.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
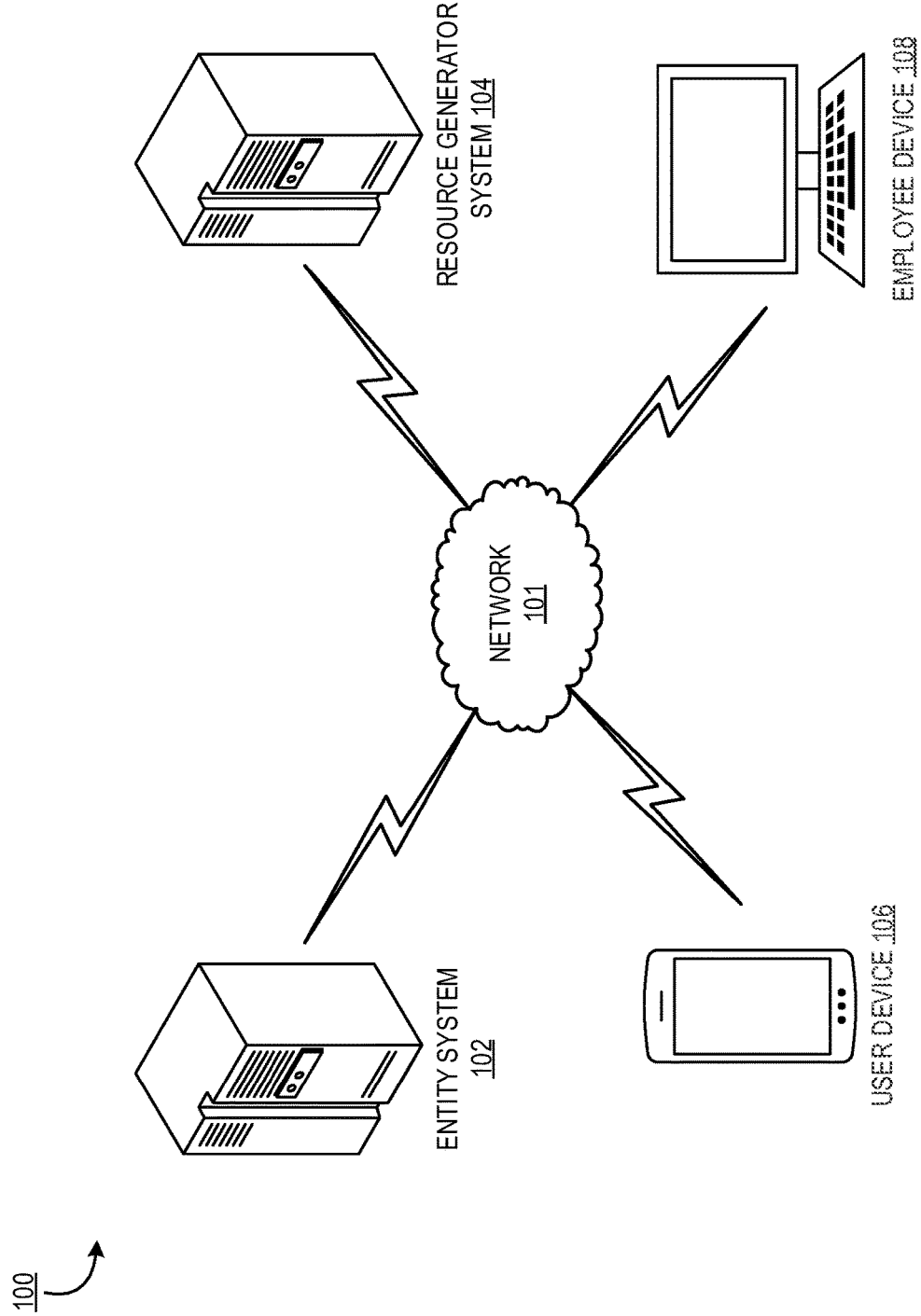
Figure 2:
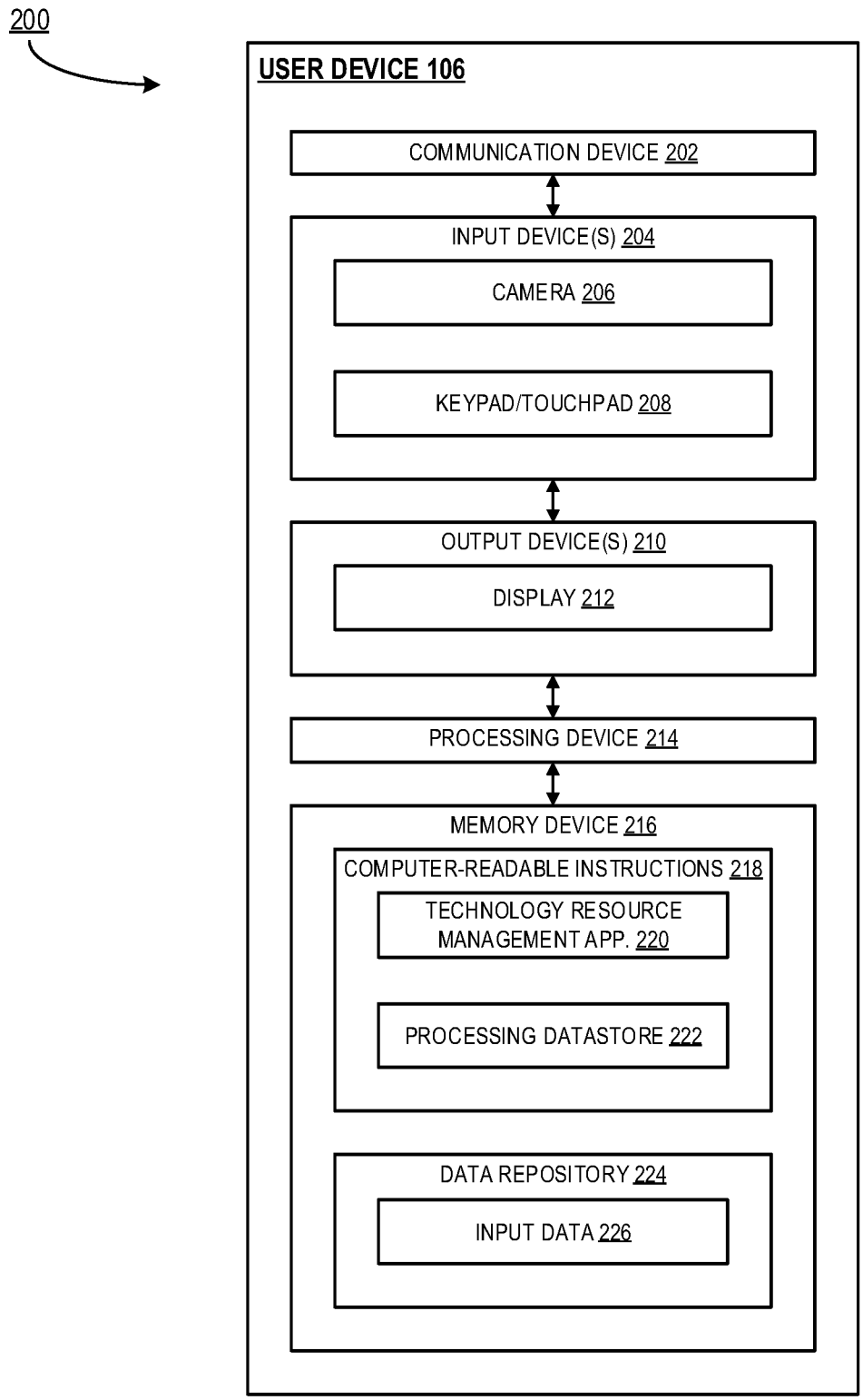
Figure 3:
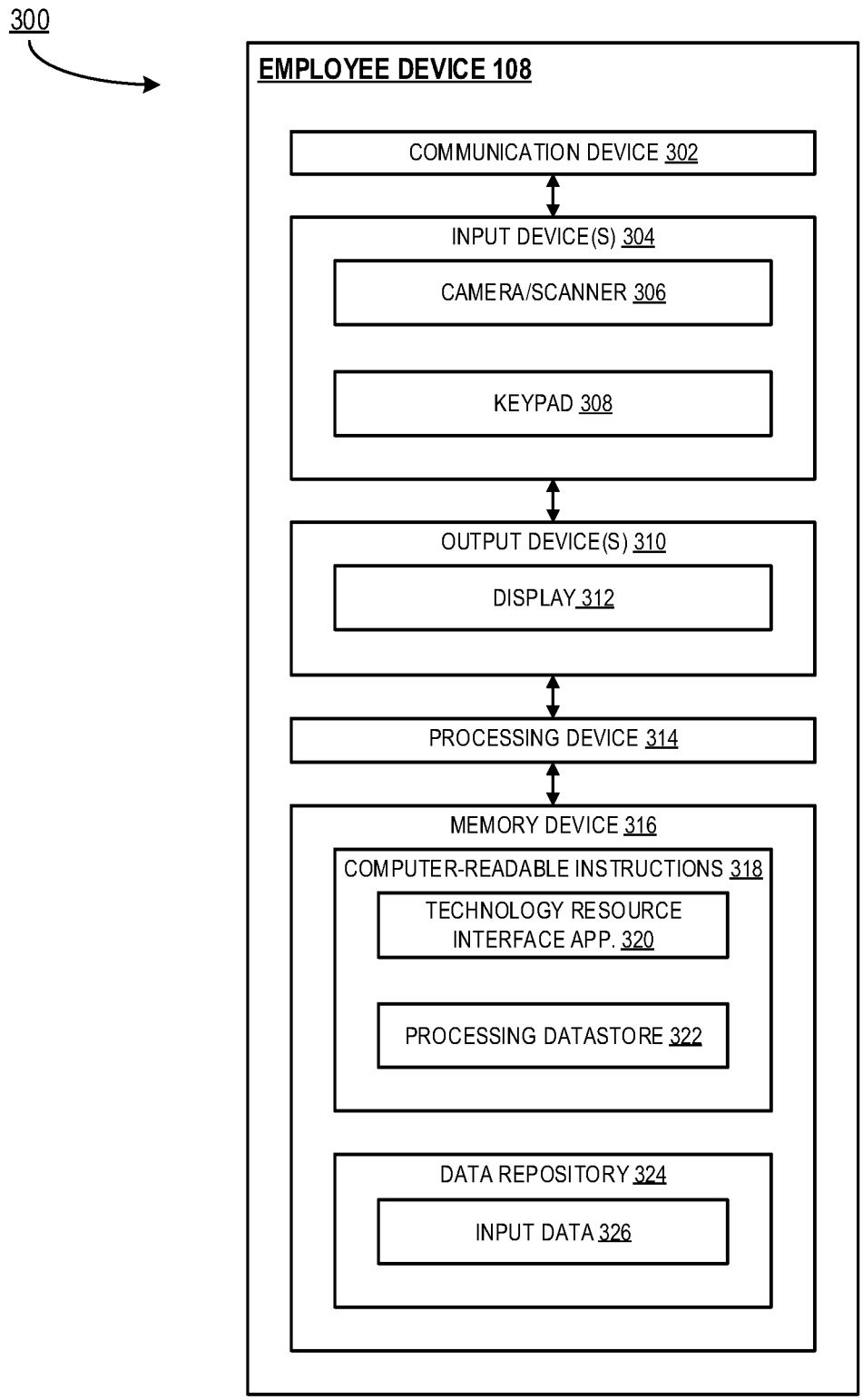
Figure 4:
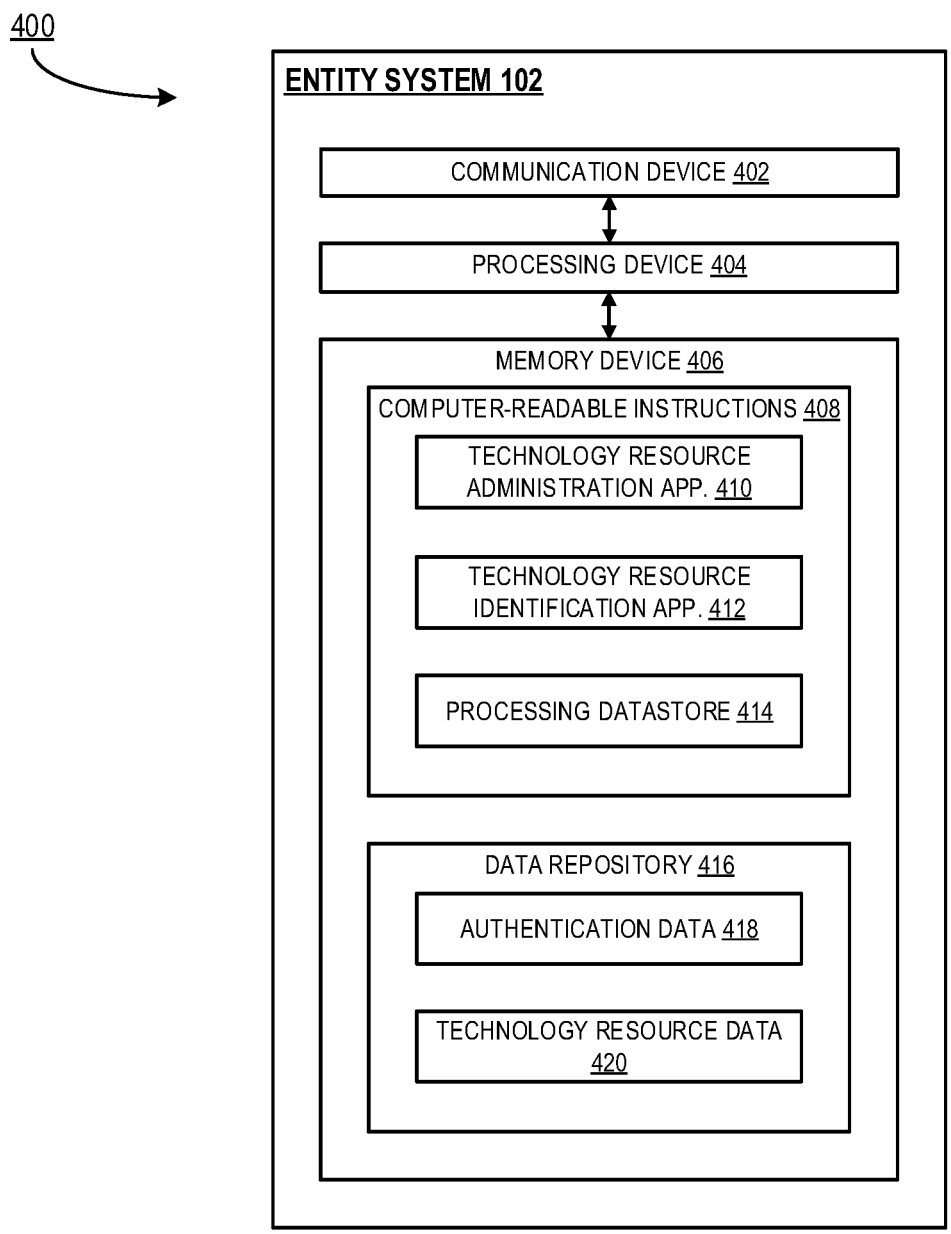
Figure 5:
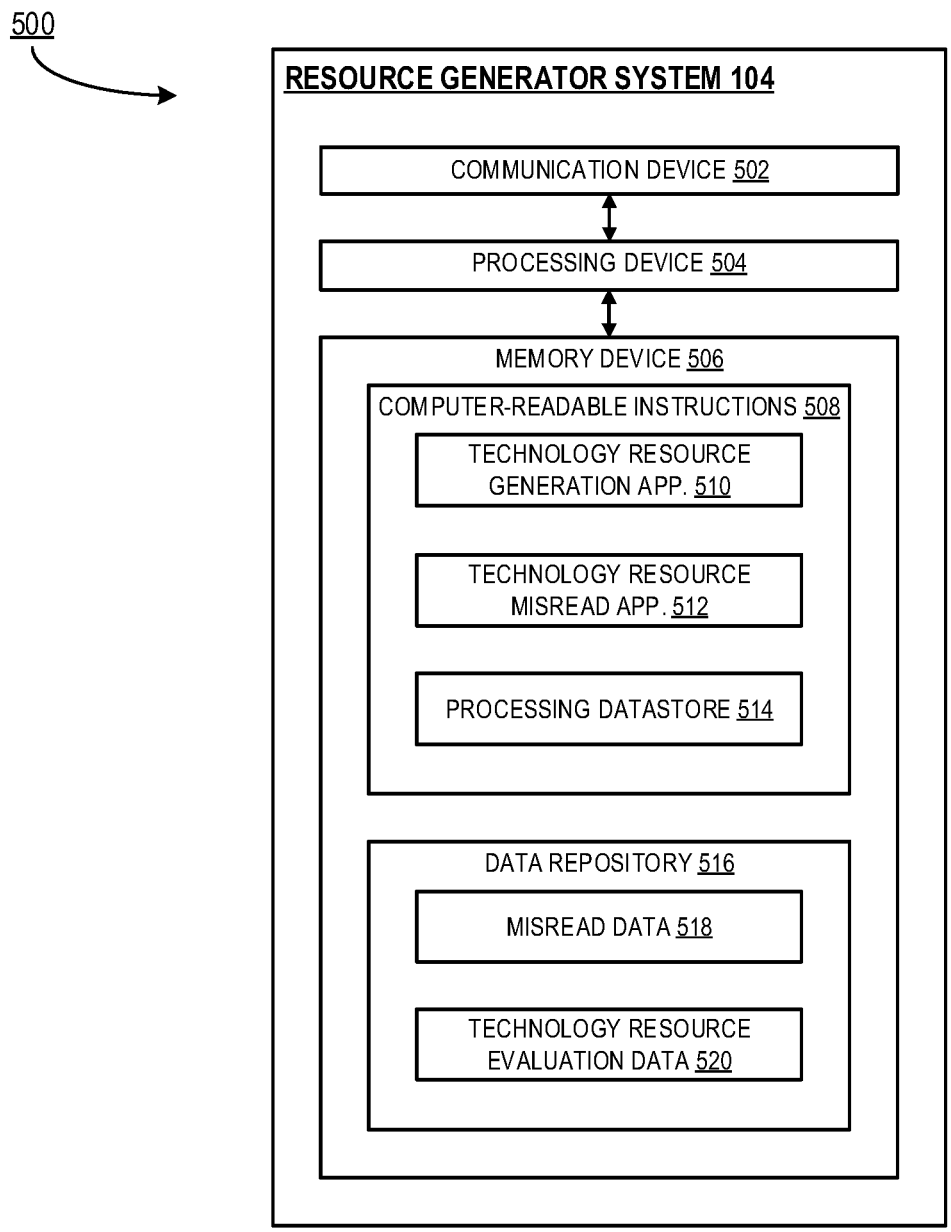
Figure 6:
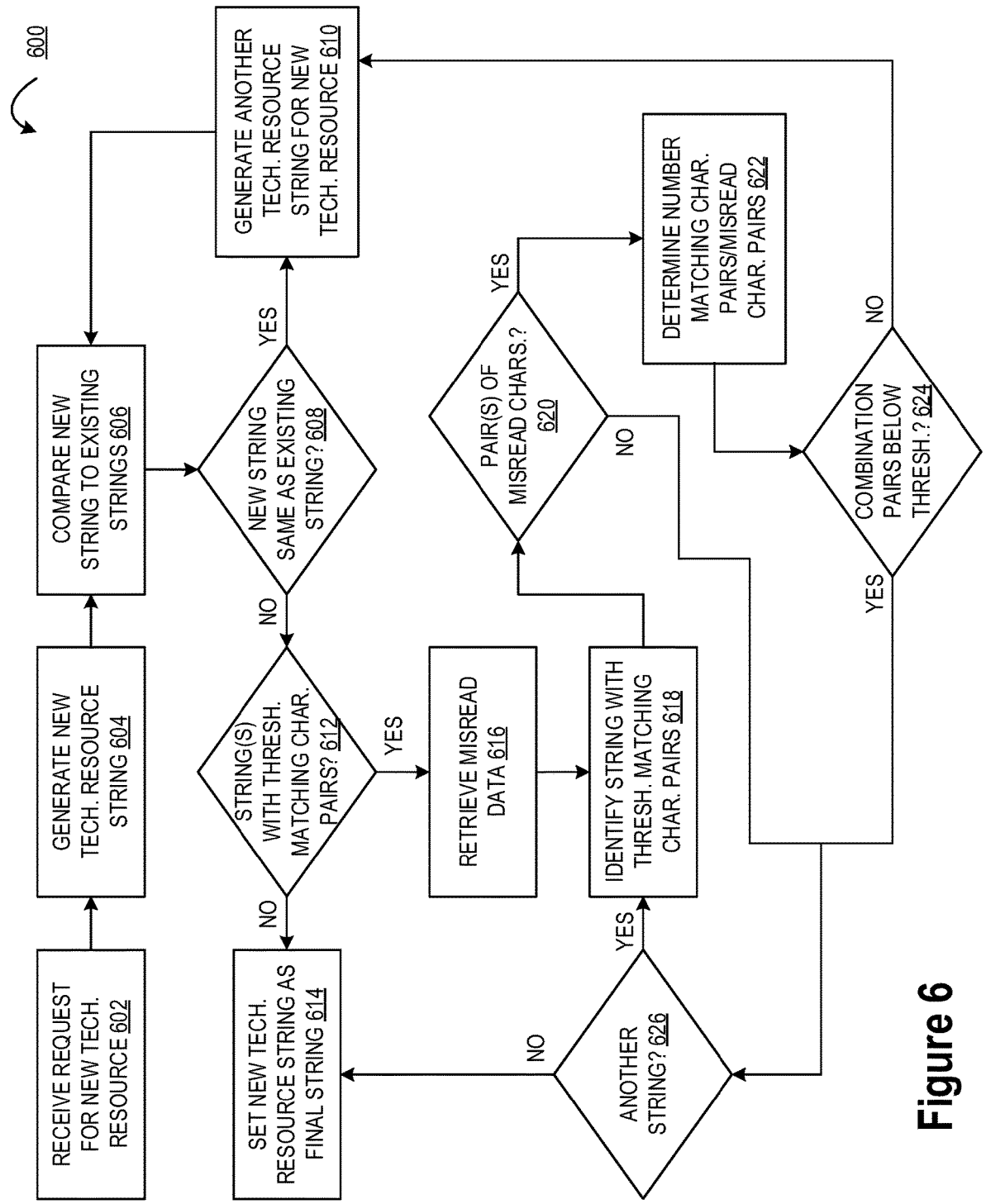
Figure 7:
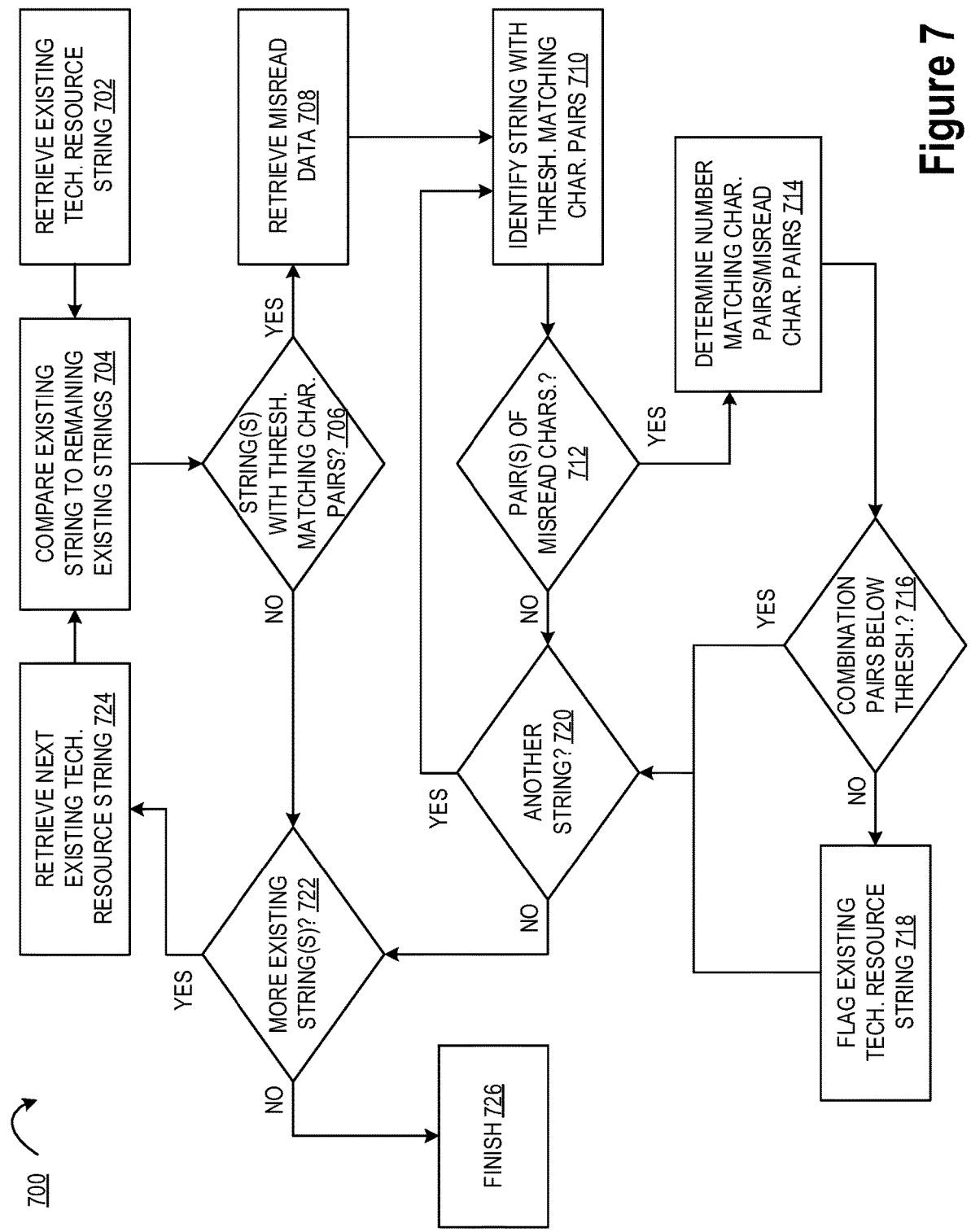

Having thus described embodiments of the invention in general terms, reference will now be made to the accompanying drawings, where:

FIG. 1 illustrates a block network architecture diagram illustrating a system environment 100 for generating resource identification strings to avoid electronic misreads, in accordance with some embodiments of the invention;

FIG. 2 illustrates a block diagram 200 of a user device, in accordance with some embodiments of the invention;

FIG. 3 illustrates a block diagram 300 of an employee device, in accordance with some embodiments of the invention;

FIG. 4 illustrates a block diagram 400 of an entity system, in accordance with some embodiments of the invention;

FIG. 5 illustrates a block diagram 500 of a resource generator system, in accordance with some embodiments of the invention;

FIG. 6 illustrates a high-level process flow 600 for generating resource identification strings to avoid electronic misreads, in accordance with some embodiments of the invention; and FIG. 7 illustrates a high-level process flow 700 for evaluating existing resource identification strings to avoid electronic misreads, in accordance with some embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" or "enterprise" as used herein may be any institution or establishment, associated with a network-connected management platform, such as a network-connected resource management platform or a network-connected electronic communication management platform. As such, the entity may be any institution, group, association, financial institution, merchant, establishment, company, union, authority, or the like.

As described herein, a "user" is an individual associated with an entity. As such, in some embodiments, the user may be an individual having past relationships, current relationships, or potential future relationships with an entity. In some instances, a "user" is an individual who has a relationship with the entity, such as a customer or a prospective customer. For example, in the instance where the entity is a resource entity or a merchant, financial institution, or the like, a user may be an individual or entity with one or more relationships, affiliations, or accounts with the entity (e.g., the merchant, the financial institution). In some instances, the user is an individual who seeks to utilize, operate, or perform one or more activities associated with a user device, often, though not necessarily, based on successful validation of the user's authentication credentials. In some instances, a user may be any individual or entity who has a relationship with a customer of the entity or financial institution. For purposes of this invention, the terms "user" and "customer" may be used interchangeably.

In some embodiments, a "user" may be an employee (e.g., a technology operator/technician, an associate, a project manager, an IT specialist, a manager, an administrator, an internal operations analyst, or the like) of the entity, or enterprises affiliated with the entity, who is capable of operating the systems described herein. Alternatively, in some embodiments, a "user" may be distinct from an employee of the entity or enterprise affiliated with the entity, as described in further detail below. For example, a user may be an individual who holds a "technology resource" or "account" with the entity, and an employee of the entity may help the user perform one or more actions with respect to the technology resource or account.

A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, user information, or the like. The technology resource or account may be associated with and/or maintained by an entity, and may typically be associated with technology infrastructure such that the resource or account may be accessed, modified, or acted upon by the user electronically, for example using transaction terminals, user devices, merchant systems, and the like. In some embodiments, the entity may provide one or more technology instruments or financial instruments to the user for executing resource transfer activities or financial transactions. In some embodiments, the technology instruments/financial instruments, like electronic tokens, credit cards, debit cards, checks, loyalty cards, entity user device applications, account identifiers, routing numbers, passcodes, and the like, may be associated with one or more resources or accounts of the user. As discussed, in some embodiments, the entity may represent a vendor or a merchant with whom the user engages in financial transactions (e.g., resource transfers, like purchases, payments, returns, enrolling in merchant accounts, and the like) or non-financial transactions (for resource transfers associated with loyalty programs and the like), either online or in physical stores or merchant locations.

As used herein, a "user interface" may be an interface for user-machine interaction. In some embodiments, the user interface comprises a graphical user interface (GUI). A GUI is a type of user interface that allows users to interact with electronic devices via graphical icons and visual indicators, such as graphical widgets, graphical icons, and visual indicators (e.g., secondary notation), as opposed to using only text via the command line. In some instances, a GUI may include both graphical elements and text elements. A GUI may also incorporate one or more elements that facilitate communication using one or more communication mediums, such as tactile communication (e.g., communication via a touchscreen, keyboard, and the like), audio communication, textual communication, and/or video communication (e.g., gestures detected by a camera). That said, the GUIs may be configured for audio, visual, and/or textual communication, and may be configured to receive input and/or provide output using one or more user device components and/or external auxiliary/peripheral devices such as a display, a speaker, a microphone, a touchscreen, a camera, a GPS device, a keypad, a mouse, and/or the like. The graphical user interface may be configured to be presented on one or more display devices associated with user devices, entity systems, auxiliary user devices, processing systems, and the like.

An electronic activity, also referred to as a "technology activity" or a "user activity," such as a "resource transfer" or "transaction," may refer to any activities or communications between a user or entity and a financial institution, between the user and the entity, activities or communication between multiple entities, communication between technology applications, and the like. A resource transfer may refer to a payment, a processing of funds, a purchase of goods or services, a return of goods or services, a payment transaction, a credit transaction, or other interactions involving a user's resource or account. In the context of a financial institution or a resource entity such as a merchant, a resource transfer may refer to one or more of: a transfer of resources/funds between financial accounts (also referred to as "resources"), a deposit of resources/funds into a financial account or resource (e.g., depositing a check), a withdrawal of resources or funds from a financial account, a sale of goods and/or services, initiating an automated teller machine (ATM) or online banking session, an account balance inquiry, a rewards transfer, opening a bank application on a user's computer or mobile device, a user accessing their e-wallet, applying one or more coupons to purchases, or any other interaction involving the user and/or a user's personal device that invokes or that is detectable by or associated with the financial institution. A resource transfer may also include one or more of the following: renting, selling, and/or leasing goods and/or services (e.g., groceries, stamps, tickets, DVDs, vending machine items, and the like); making payments (e.g., paying monthly bills and the like); loading money onto stored value cards (SVCs) and/or prepaid cards; donating to charities; and/or the like. Unless specifically limited by the context, a "resource transfer," a "transaction," a "transaction event," or a "point of transaction event" may refer to any user activity (financial or non-financial activity) initiated between a user and a resource entity (such as a merchant), between the user and a financial institution, or any combination thereof.

In some embodiments, a resource transfer or transaction may refer to financial transactions involving direct or indirect movement of funds through traditional paper transaction processing systems (i.e., paper check processing) or thorough electronic transaction processing systems. In this regard, resource transfers or transactions may refer to the user initiating a funds/resource transfer between accounts; a funds/resource transfer as a payment for the purchase for a product, service, or the like from a merchant; and the like. Typical financial transactions or resource transfers may include point-of-sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, etc. When discussing that resource transfers or transactions are evaluated, it could mean that the transaction has already occurred, is in the process of occurring or being processed, or has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures, and the like.

In accordance with embodiments of the invention, the term "electronic communication" may refer to a communication associated with a user and/or an entity employee, typically received, viewed, and/or transmitted via a communication channel. In some embodiments, electronic communications may be associated with user and/or entity employee communications relating to travel, appointments, etc. (e.g., non-financial communications). In some embodiments, electronic communications may be associated with user and/or entity employee communications relating to user financial statements (e.g., savings statements, shareholder notices, etc.), bill payments, account notifications, communications requiring actions to be performed by the user or entity employee, communications triggering resource/account activities, documents to be signed by the user or entity employee, etc. (e.g., financial communications). In some embodiments, communication channels may comprise cellular, audio, email, cellular messaging, website, mobile application notifications, and the like.

Under current system and methods, an entity may generate strings of characters for technology resources held by users. Each of these technology resource strings may be unique and therefore uniquely identify the technology resource that the string corresponds to. As such, if an individual or group, such as a user or an employee of the entity, wants to perform an action with respect to the technology resource, the individual/group may provide the technology resource string to the entity. The entity may then be able to identify the technology resource from the technology resource string such that the action can be performed.

In some cases, the technology resource string may by provided to the entity through an electronic document that requires processing to extract the technology resource string from the electronic document. For instance, the entity system may be sent an image or scan of a paper document on which the technology resource string may be written or printed. The entity system may then run optical character recognition on the electronic document to identify the technology resource string. However, the process of electronically reading the technology resource string may, in some situations, lead to an electronic misreads of one or more characters in the technology resource string. Through electronic misreads, the optical character recognition process may produce a technology resource string that does not match the technology resource string on the electronic document. If the misread technology resource string does not match any other technology resource string stored at the entity, there may be an error, and the entity will be unable to be perform the action until the technology resource string is correctly identified to the entity. Nevertheless, in some situations, the misread technology resource string may match an existing technology resource string stored at the entity. As such, the action may be incorrectly performed with respect to the misread technology resource string instead of the correct technology resource string. The entity may have a process for correcting the action, but the correction process may take time and manual review by an employee of the entity. Additionally, some characters may be more commonly misread for each other than other characters. Thus, in some cases, a technology resource string may be misread as another existing technology resource string more than once.

Accordingly, embodiments of the present disclosure are directed to systems and methods configured for generating technology resource strings so as to avoid electronic misreads. More specifically, a system configured for generating technology resource strings may verify that a newly generated technology resource string does not match any existing technology resource string. After verifying that there is not an exact match, the system may evaluate the characters of the new technology resource string compared to the characters of the existing technology resource strings to determine if characters in similar or the same positions between the new string and a given existing string are the same between the two strings and/or are characters that are commonly electronically misread. If there is a certain combination of matching and/or commonly misread character pairs, the resource generation system may determine that there is a high enough likelihood of electronic misread that the new technology resource string should be discarded and another new technology resource string should be generated. As such, the present systems and methods may proactively help prevent electronic misreads by setting a technology resource string for a technology resource that has a likelihood of an electronic misread below a certain threshold.

Further, in some cases, the resource generator system may evaluate a given existing technology resource string to make a similar determination with respect to the remaining existing technology resource strings. Thus, the resource generator system may flag whether a given existing technology resource string has a certain likelihood of a future electronic misread such that one or more preventative steps may be performed with respect to the existing technology resource string. For example, the existing technology resource string may be flagged for manual review whenever optical character recognition produces the existing technology resource string to help prevent an action from being performed to a misread technology resource. Accordingly, the present systems and methods may further proactively help prevent incorrect actions due to electronic misreads for existing technology resource strings that cannot be easily changed.

As noted above, correcting an action applied to an incorrect technology resource may also take time and employee resources. Additionally, the process of a user taking up the incorrect action with the entity and having the incorrect action resolved takes processing bandwidth at the systems associated with the entity, particularly when such corrective actions are taken in aggregate across all of the users associated with the entity. Therefore, the present systems and methods may free up processing bandwidth at the entity systems, as well as employee resources, for other actions. Moreover, electronic misreads uniquely stems from image and electronic document processing technology such that the systems and methods described herein solve an issue in image and electronic processing systems, as well as technology resource processing systems that are then affected by the electronic misreads. Further, in some cases, the entity may have thousands or millions of technology resources that are held with the entity, where each technology resource has an associated technology resource string. As such, evaluating whether a new or existing technology resource string may be subjected to an electronic misread with respect to every other existing technology resource string would not be feasible, for example, for an employee of the entity to perform. For at least these reasons, the present systems and methods provide numerous technical advantages.

Referring to FIG. 1, a block diagram illustrating a system environment 100 configured for generating resource identification strings to avoid electronic misreads is illustrated, in accordance with some embodiments of the invention. As illustrated, the system environment 100 includes an entity system 102 in operative communication with a resource generator system 104. In some embodiments, as shown in FIG. 1, the system environment 100 may also include a user device 106 and/or an employee device 108 in operative communication with the entity system 102. As such, in various embodiments, the entity system 102, the resource generator system 104, the user device 106, and the employee device 108 are configured to send data to and receive data from each other, such as data relating to generating resource identification strings and/or evaluating existing resource strings for the potential of future electronic misreads, as described in further detail below.

The entity system 102, the resource generator system 104, the user device 106, and the employee device 108 may be in electronic communication with each other via the network 101, which may be the internet, an intranet, or the like. The network 101 is configured to establish an operative connection between otherwise incompatible devices, for example, by establishing a communication channel, automatically and in real time, between the entity system 102, the resource generator system 104, the user device 106, and/or employee device 108. In this regard, the wireless communication channel may further comprise near field communication (NFC), communication via radio waves, communication through the internet, communication via electromagnetic waves, and the like. In FIG. 1, the network 101 may include a local area network (LAN), a wide area network (WAN), a global area network (GAN), and/or a near field communication (NFC) network. Accordingly, the network 101 may provide for wireline, wireless, or a combination of wireline and wireless communication between devices in the network 101.

The entity system 102 is associated with the entity and configured to store information relating to the relationship the user associated with the user device 106 has with the entity. For example, if the user has a relationship with the entity based on an account or technology resource the user maintains with the entity, the entity system 102 may store information about the user and information about the resources the user stores in the account or technology resource. Alternatively, in some embodiments, the user and the employee may be the same such that the entity system 102 may store information relating to the relationship the employee has with the entity. In this way, the technology resource held by the user/employee with the entity may be, for example, an employment account. Additionally, the entity system 102 is configured to receive image data or other electronic files or documents from the user device 106 and/or the employee device 108, where an electronic file includes a technology resource string associated with the technology resource that the user holds with the entity. The entity system 102 may then use the electronic file to identify the technology resource. Further, in response to identifying the technology resource, the entity system 102 may perform one or more actions and/or may allow the user device 106 and/or employee device 108 to perform one or more actions relating to the technology resource, such as one or more actions relating to the management of the technology resource. The entity system 102 is also configured to transmit a request for a new technology resource to the resource generator system 104 and receive a unique string of alphanumeric characters to use as a resource identification string for the new technology resource (e.g., a unique resource identification number) from the resource generator system 104. The components of the entity system 102, its features, and its functions will be described in further detail below and with respect to FIG. 4, in particular.

The resource generator system 104 is configured to receive a request for a new technology resource from the entity system 102 and, in response, generate a unique string of characters (e.g., a unique string of numbers, a unique string of alphanumeric characters) to use as a resource identification string for the new technology resource. The generation of the unique string of characters includes evaluating whether a newly generated technology resource string has a threshold likelihood of being electronically misread as an existing technology resource string, such as during a process in which the newly generated string is imaged or scanned and an electronic form of the newly generated string is created from the image or scan using optical character recognition (OCR). In some embodiments, the resource generator system 104 is also configured to evaluate existing technology resource strings against the remaining existing technology resource strings and flag existing technology resource strings with a certain likelihood of being electronically misread as another existing technology resource string in the future. The components of the resource generator system 104, its features, and its functions will be described in further detail below and with respect to FIG. 5, in particular.

A user device 106 may comprise a mobile communication device, such as a cellular telecommunications device (e.g., a smartphone or mobile phone), a computing device such as a laptop computer or a desktop computer, a personal digital assistant (PDA), a mobile internet accessing device, or other mobile device including, but not limited to, a pager, a mobile television, a camera, a video recorder, an audio/video player, a radio, a global positioning system (GPS) device, an combination of the aforementioned, or the like. The user device 106 is configured to connect to the network 101, as well as receive and transmit information over the network 101. As an illustration, the user device 106 may transmit a user credential to the entity system 102 as part of a log-on attempt to access the user's technology resource and communicate with the entity system 102 to allow the user to manage the technology resource. Additionally, the user device 106 may transmit an image or scan of a technology resource character string, or another electronic file or document containing the technology resource character string that requires processing to extract the technology resource character string from the electronic file or document, to the entity system 102 as part of managing the user's technology resource. The components of the user device 106, its features, and its functions will be described in further detail below and with respect to FIG. 2, in particular.

An employee device 108 may comprise a personal computing device, such as a desktop computer or laptop computer. Alternatively, in some cases, the employee device 108 may comprise a mobile communications device, such as a cellular telecommunications device (e.g., a smartphone or mobile phone), a personal digital assistant (PDA), a mobile internet access device, or other mobile device. As such, in some embodiments, the employee device 108 may be similar to the user device 106 described above. The employee device 108 is also configured to connect to the network 101, as well as transmit and receive information over the network 101. As an illustration, the employee device 108 may transmit an image or scan of a technology resource character string, or another electronic file or document containing the technology resource character string, to the entity system 102 such that the entity system 102 can identify the technology resource associated with the string and the employee may perform one or more administration actions on the technology resource via the employee device 108. The components of the employee device 108, its features, and its functions will be described in further detail below and with respect to FIG. 3, in particular.

FIG. 2 illustrates a block diagram 200 of the user device 106, in accordance with some embodiments of the invention. As illustrated in FIG. 2, the user device 106 may include a communication device 202, one or more input devices 204, one or more output devices 210, a processing device 214, and a memory device 216 having a technology resource management application 220 and a processing datastore 222 stored therein. As shown, the processing device 214 is operatively connected to and configured to control and cause the communication device 202, the input device(s) 204, the output device(s) 210, and the memory device 216 to perform one or more functions. In some embodiments, the technology resource management application 220 comprises computer-readable instructions or computer-readable code that when executed by the processing device 214 causes the processing device 214 to perform one or more functions that allow the user associated with the user device 106 to manage a technology resource held by the user with the entity. For example, the technology resource management application 220 may include a computer-readable program code having one or more executable portions. It will be understood that the technology resource management application 220 may be executable to initiate, perform, complete, and/or facilitate one or more portions of any of the embodiments described and/or contemplated herein.

The communication device 202 may generally include a modem, server, transceiver, and/or other device for communicating with other devices on the network 101. In some embodiments, the communication device 202 may be a communication interface having one or more communication devices configured to communicate with one or more devices on the network 101, such as the entity system 102, the resource generator system 104, and the employee device 108. The communicative connection to one or more devices on the network 101 may be via a wired or wireless connection. In this regard, the wireless communication channel may comprise near field communication (NFC), communication via radio waves, communication through the internet, communication via electromagnetic waves, communication via applicable cellular systems of wireless telephone networks, and the like.

The input device(s) 204 are configured to receive an input from the user. The input may include written information or commands, an image, a video, a sound, and/or the like. As such, the input device(s) 204 may include various devices configured to receive and interpret inputs from the user. The input device(s) 204 may include devices that are integrated into the user device 106, such as a built-in keypad or display, in some cases and/or external devices that are connected to the user device 106, such as an external keyboard or monitor, in some cases. In some embodiments, the input device(s) 204 may include a camera 206 and a keypad or touchpad 208, as shown in FIG. 2. Alternatively or additionally, in some embodiments, the input device(s) 204 may include other types of input devices, such as a microphone.

The output device(s) 210 are configured to provide an output to the user. The output may include written information, images, videos, sounds, GUIs, and/or the like. As such, the output device(s) 210 may include various devices configured to provide an output to the user. The output device(s) 210 may include devices that are integrated into the user device 106, such as a built-in display, in some cases and/or devices that are connected to the user device 106, such as an external display, in some cases. In some embodiments, the output device(s) 210 may include a display 212, as shown in FIG. 2. Alternatively or additionally, in some embodiments, the output device(s) 210 may include other types of output devices, such as a speaker. Further, in some embodiments, at least some of the input device(s) 204 may be integrated with at least some of the output device(s) 210. For instance, the keypad or touchpad 208 may be integrated with the display 212.

Additionally, referring to the user device 106 illustrated in FIG. 2, the processing device 214 may generally refer to a device or combination of devices having circuitry used for implementing the communication and/or logic functions of the processing device 214. For example, the processing device 214 may include a control unit; a digital signal processor device; a microprocessor device; and various analog-to-digital converters, digital-to-analog converters, and other support circuits and/or combinations of the foregoing. Control and signal processing of the user device 106 may be allocated between these processing devices according to their respective capabilities. The processing device 214 may further include functionality to operate one or more software programs based on computer-readable instructions 218 thereof, which may be stored in the memory device 216.

As the phrase is used herein, a processing device may be "configured to" perform a certain function in a variety of ways, including, for example, by having one or more general-purpose circuits perform the function by executing particular computer-executable program code embodied in a computer-readable medium and/or by having one or more application-specific circuits perform the function. The processing device 214 may be configured to use the network communication interface of the communication device 202 to transmit and/or receive data and/or commands to and/or from the devices/systems connected to the network 101.

The memory device 216 within the user device 106 may generally refer to a device or combination of devices that store one or more forms of computer-readable media for storing data and/or computer-executable program code/instructions. For example, the memory device 216 may include any computer memory that provides an actual or virtual space to temporarily or permanently store data and/or commands provided to the processing device 214 when it carries out the functions described herein.

The user device 106 may further include a data repository 224 comprising input data 226. The processing device 214 may generate the input data 226 through inputs provided by the user via the one or more input devices 204. For example, the input data 226 may include image data generated by the camera 206, such as an image of a technology resource character string. In some cases, the input data 226 may also include electronic data that the user provides to the user device 106, such as through the technology resource management application 220. For instance, the input data 226 may include an electronic file that the user uploads to the user device 106.

In some embodiments, the technology resource management application 220 may comprise computer-readable instructions associated with one or more technology resource management steps, or the computer-readable instructions associated with one or more technology resource management steps may be stored in the processing datastore 222. In some embodiments, the technology resource management application 220 comprises computer-readable instructions that, when executed by the processing device 214, cause the processing device 214 to perform one or more functions and/or transmit control instructions to other components or devices to perform one or more steps for facilitating the user in managing the user's technology resource.

These one or more steps for facilitating the user in managing a technology resource the user holds with the entity may include communicating with the entity system 102 such that the user can perform actions with respect to the user's technology resource. In some embodiments, the entity system 102 may authenticate the user before the user can employ the technology resource management application 220 to manage the user's technology resource. As such, the user may input authentication credentials into the user device 106 (e.g., using the keypad/touchpad 208), which the technology resource management application 220 transmits to the entity system 102. Once the user has been authenticated (e.g., the user device 104 receives a session token from the entity system 102), the user may be able to manage their technology resource from the user device 106 via the technology resource management application 220. For example, using the technology resource management application 220, the user may perform a resource transfer to and/or from the technology resource, withdraw resources from the technology resource, deposit resources to the technology resource, change personal information with respect to the technology resource, make an order relating to the technology resource, receive one or more financial and authentication credential tokens at the user device 106, and/or the like.

In some cases, managing the technology resource may include transmitting an image to the entity system 102. As an illustration, the user may make a resource transfer into or out of the user's technology resource by transmitting an image of a technology resource character string to the entity system 102, where the technology resource character string may be associated with a technology resource from which or to which the resource transfer will be made. For instance, the image may be of a deposit slip, a paper check, a paper invoice, and/or the like. Accordingly, the technology resource management application 220 may be configured to receive an image via the camera 206 that the technology resource management application 220 transmits to the entity system 102. Alternatively, in some cases, managing the technology resource may include transmitting an electronic document to the entity system 102, such as an electronic invoice associated with a resource transfer to or from the user's technology resource.

FIG. 3 illustrates a block diagram 300 of the employee device 108, in accordance with some embodiments of the invention. As illustrated in FIG. 3, the employee device 108 may include a communication device 302, one or more input devices 304, one or more output devices 310, a processing device 314, and a memory device 316 having a technology resource interface application 320 and a processing datastore 322 stored therein. As shown, the processing device 314 is operatively connected to and configured to control and cause the communication device 302, the input device(s) 304, the output device(s) 310, and the memory device 316 to perform one or more functions. In some embodiments, the technology resource interface application 320 comprises computer-readable instructions or computer-readable code that when executed by the processing device 314 causes the processing device 314 to perform one or more functions that allow an employee of the entity to perform actions with respect to one or more technology resources held at the entity. For example, the technology resource interface application 320 may include a computer-readable program code having one or more executable portions. It will be understood that the technology resource interface application 320 may be executable to initiate, perform, complete, and/or facilitate one or more portions of any of the embodiments described and/or contemplated herein.

The communication device 302 may generally include a modem, server, transceiver, and/or other device for communicating with other devices on the network 101. In some embodiments, the communication device 302 may be a communication interface having one or more communication devices configured to communicate with one or more devices on the network 101, such as the entity system 102, the resource generator system 104, and the user device 106. The communicative connection to one or more devices on the network 101 may be via a wired or wireless connection similar to the implementation of the communication device 202 of the user device 106.

The input device(s) 304 may be configured to receive an input from the employee associated with the employee device 108. The input may include written information or commands, an image, a video, a sound, and/or the like. As such, the input device(s) 304 may include various devices configured to receive and interpret inputs from the employee. Similar to the user device 106, the input device(s) 204 may include devices that are integrated into the employee device 108, in some cases, and/or external devices that are connected to the employee device 108, in some cases. In some embodiments, the input device(s) 304 may include a camera and/or scanner 306 and a keypad 308, as shown in FIG. 2. Alternatively or additionally, n some embodiments, the input device(s) 204 may include other types of input devices, such as a microphone.

The output device(s) 310 may be configured to provide an output to the employee. The output may include written information, images, videos, sounds, GUIs, and/or the like. Accordingly, the output device(s) 310 may include various devices configured to provide an output to the employee. Similar to the user device 106, the output device(s) 310 may include devices that are integrated into the employee device 108, in some cases, and/or external devices that are connected to the employee device 108, in some cases. In some embodiments, the output device(s) 310 may include a display 312, as shown in FIG. 3. Alternatively or additionally, in some embodiments, the output device(s) 310 may include other types of output devices, such as a speaker. Further, in some embodiments, at least some of the input device(s) 304 may be integrated with at least some of the output device(s) 310, similar to the user device 106.

Additionally, referring to the employee device 108 illustrated in FIG. 3, the processing device 314 may generally refer to a device or combination of devices having circuitry used for implementing the communication and/or logic functions of the processing device 314. In this way, the processing device 314 may be configured similarly to the processing device 214 of the user device 106. The processing device 314 may further include functionality to operate one or more software programs based on computer-readable instructions 318 thereof, which may be stored in the memory device 316, such as the technology resource interface application 320. The processing device 314 may be configured to use the network communication interface of the communication device 302 to transmit and/or receive data and/or commands to and/or from the other devices/systems connected to the network 101, similar to the processing device 214 of the user device 106.

The memory device 316 within the employee device 108 may generally refer to a device or combination of devices that store one or more forms of computer-readable media for storing data and/or computer-executable program instructions. For example, the memory device 316 may include any computer memory that provides an actual or virtual space to temporarily or permanently store data and/or commands provided to the processing device 314 when it carries out the functions described herein, similar to the memory device 216 of the user device 106.

The employee device 108 may further include a data repository 324 comprising input data 326. The processing device 314 may generate the input data 326 through inputs provided by the employee via the one or more input devices 304. For example, similar to the user device 106, the input data 326 may include image data generated by the camera or scanner 306. In some cases, the input data 326 may also include electronic data that the employee provides to the employee device 108, such as through the technology resource interface application 320. For instance, the input data 226 may include an electronic file that the employee uploads to the employee device 108 or receives at the employee device 108 (e.g., from the user device 106).

In some embodiments, the technology resource interface application 320 may comprise computer-readable instructions associated with one or more technology resource interface steps, or the computer-readable instructions associated with one or more technology resource interface steps may be stored in the processing datastore 322. In some embodiments, the technology resource interface application 320 comprises computer-readable instructions that, when executed by the processing device 314, cause the processing device 314 to perform one or more functions and/or transmit control instructions to other components or devices to perform one or more steps for interfacing with the entity system 102.

These one or more steps for interfacing with the entity system 102 may include communicating with the entity system 102 such that the employee can perform actions with respect to a technology resource. The actions may include opening a new technology resource for a user, closing a technology resource for a user, helping a user perform a resource transfer to and/or from the technology resource, helping a user withdraw resources from the technology resource, helping a user deposit resources from the technology resource, changing personal information associated with the technology resource, and/or the like. Alternatively, in some cases, the employee may be the user, and the actions may be on the employee's behalf. For example, the technology resource interface application 320 may allow the employee to access an employment portal hosted on the entity system 102 and through which the employee performs one or more actions related to their employment.

In some cases, as part of interfacing with the entity system 102, the technology resource interface application 320 may transmit an image or scan to the entity system 102. For example, the employee may help a user perform a resource transfer by transmitting an image of a technology resource character string to the entity system 102, where the technology resource character string may be associated with a technology resource from which or to which the resource transfer will be made. As an illustration, the image may be of a deposit slip, a paper check, a paper invoice, and/or the like. As such, the technology resource interface application 320 may be configured to receive an image from the camera or scanner 306, where the technology resource interface application 320 transmits the image or scan to the entity system 102. Alternatively, in some cases, the technology resource interface application 320 may transmit an electronic document, such as an electronic invoice, to the entity system 102.

It should be understood that, in some implementations, the system environment 100 may include both the user device 106 and the employee device 108. However, in other implementations, the system environment 100 may include the user device 106 or the employee device 108. For instance, in an implementation where a technology resource is associated with an employment account, the user and the employee may be the same individual, and the system environment 100 may include the employee device 108 but not the user device 106. As another example, in an implementation where the user can manage a technology resource held with the entity without consulting an employee, the system environment 100 may include the user device 106 but not the employee device 108.

Additionally, in some embodiments, rather than the image, scan, or other electronic document or file that contains a technology resource character string being transmitted to the entity system 102 by the user device 106 and/or the employee device 108, as described above, the electronic file may be transmitted by a third party. For example, in some cases, the entity system 102 may receive the electronic document as part of a resource transfer from a technology resource held at the entity system 102 to a technology resource held at another entity. As such, the entity may be a first entity, and the entity system 102 may receive the electronic document from a system associated with a second entity. Alternatively, the entity system 102 may receive the electronic document from a user associated with the second entity.

FIG. 4 illustrates a block diagram 400 of the entity system 102, in accordance with some embodiments of the invention. As illustrated in FIG. 4, the entity system 102 may include a communication device 402; a processing device 404; and a memory device 406 having a technology resource administration application 410, a technology resource identification application 412, and a processing datastore 414 stored therein. As shown, the processing device 404 is operatively connected to and configured to control and cause the communication device 402 and the memory device 406 to perform one or more functions. In some embodiments, the technology resource administration application 410 and/or technology resource identification application 412 comprises computer-readable instructions or computer-readable code that when executed by the processing device 404 causes the processing device 404 to perform one or more functions. For example, the technology resource administration application 410 and/or technology resource identification application 412 may include computer-readable program code having one or more executable portions. It will be understood that the technology resource administration application 410 and/or technology resource identification application 412 may be executable to initiate, perform, complete, and/or facilitate one or more portions of any embodiments described and/or contemplated herein.

The communication device 402 may generally include a modem, server, transceiver, and/or other device for communicating with other devices on the network 101. In some embodiments, the communication device 402 may be a communication interface having one or more communication devices configured to communicate with one or more devices on the network 101, such as the resource generator system 104, the user device 106, and the employee device 108. As such, the communicative connection of the communication device 402 may be a wired or wireless connection similar to the implementation of the communication device 202 of the user device 106.

Referring to the entity system 102 illustrated in FIG. 4, the processing device 404 may generally refer to a device or combination of devices having circuitry used for implementing the communication and/or logic functions of the processing device 404. In this way, the processing device 404 may be configured similarly to the processing device 214 of the user device 106. Additionally, the processing device 404 may further include functionality to operate one or more software programs based on computer-readable instructions 408 thereof, which may be stored in the memory device 406, such as the technology resource administration application 410 and the technology resource identification application 412. The processing device 404 may be configured to use the network communication interface of the communication device 402 to transmit and/or receive data and/or commands to and/or from the other devices/systems connected to the network 101, similar to the processing device 214 of the user device 106.

The memory device 406 within the entity system 102 may generally refer to a device or combination of devices that store one or more forms of computer-readable media for storing data and/or computer-executable program instructions. For example, the memory device 406 may include any computer memory that provides an actual or virtual space to temporarily or permanently store data and/or commands provided to the processing device 404 when it carries out the functions described herein, similar to the memory device 216 of the user device 106.

The entity system 102 may further include a data repository 416 comprising authentication data 418 and technology resource data 420. The processing device 404 may utilize the authentication data 418 to validate user authentication credentials, for example, input by the user and submitted by the user device 106 when the user accesses the technology resource management application 220. In some cases, the authentication data 418 may also include authentication data for the employee associated with the employee device 108. For instance, the entity system 102 may authenticate the employee using authentication credentials provided by the employee and transmitted to the entity system 102 by the employee device 108 before the employee can use the technology resource interface application 320.

The technology resource data 420 may reflect current data for the technology resource held the user associated with the user device 106, as well as other technology resources held by other users with the entity. For example, the technology resource data 420 may include the names of one or more technology resources that the user holds with the entity, resource balances in one or more accounts that the user holds with the entity, personal information of the user, the technology resource string associated with the technology resource, and/or the like.

In some embodiments, the technology resource administration application 410 may comprise computer-readable instructions associated with one or more technology resource administration steps, or the computer-readable instructions associated with one or more technology resource administration steps may be stored in the processing datastore 414. The technology resource administration application 410 may be embodied within the technology resource identification application 412, in some instances, or the technology resource identification application 412 may be embodied within the technology resource administration application 410, in some instances. In some embodiments, the technology resource administration application 410 comprises computer-readable instructions that, when executed by the processing device 404 cause the processing device 404 to perform one or more functions and/or transmit control instructions to other components or devices to perform the one or more technology resource administration steps described herein.

These technology resource administration steps may include receiving requests from the user device 106 and/or the employee device 108 relating to a technology resource held with the entity. For example, the technology resource administration application 410 may receive, from the user device 106 and/or the employee device 108, a request for a resource transfer to and/or from a technology resource. In response, the technology resource administration application 410 may determine whether the resource transfer can be performed and, if it can, carry out the resource transfer. The technology resource administration application 410 may also perform additional administration actions with respect to technology resources, such as allowing a user to change their personal information associated with a technology resource (e.g., change an address, a phone number, and/or the like), providing a balance for the technology resource to the user device 106, allowing the user to make a withdrawal from the technology resource, and/or the like. The technology resource administration application 410 may further generate GUIs as part of the technology resource administration that the technology resource administration application 410 transmits, for example, to the user device 106 and/or the employee device 108.

Additionally, the technology resource administration application 410 may receive requests for new technology resources. As an example, the employee device 108 may submit a request for a new technology resource on the behalf of a new or existing user. As another example, the user device 106 may submit a request for a new technology resource directly to the entity system 102. Alternatively, in some embodiments, the technology resource administration application 410 may be configured to initiate the generation of a new technology resource. For instance, the technology resource administration application 410 may periodically initiate the generation of a bulk number of new technology resources, either based on a schedule or based on demand. The technology resource administration application 410 may save the bulk new technology resources in the technology resource data 420 of the data repository 416 such that new or existing users requesting a new technology resource are assigned one of the pre-generated bulk technology resources. As another alternative, the technology resource administration application 410 may periodically initiate the generation of a portion of technology resources in bulk, such as the generation of technology resource strings, which the technology resource administration application 410 stores in the technology resource data 420 of the data repository 416. As such, when a new or existing user requests a new technology resource, the technology resource itself may be generated at the time of the request, but the new technology resource may be assigned one of the pre-generated technology resource strings stored in the data repository 416 of the technology resource data 420.

In some embodiments, the technology resource identification application 412 may comprise computer-readable instructions associated with one or more technology resource identification steps, or the computer-readable instructions associated with one or more technology resource identification steps may be stored in the processing datastore 414. The technology resource identification application 412 may be embodied within the technology resource administration application 410, in some instances, or the technology resource administration application 410 may be embodied within the technology resource identification application 412, in some instances. In some embodiments, the technology resource identification application 412 comprises computer-readable instructions that, when executed by the processing device 404, cause the processing device 404 to perform one or more functions and/or transmit control instructions to other components or devices to perform the one or more technology resource identification steps described herein.

These technology resource identification steps may include receiving an image, scan, or other electronic file that includes a technology resource string associated with a technology resource held with the entity. As discussed above, the technology resource string may include a string of alphanumeric characters, such as a number, that represent a specific technology resource. In some cases, the technology resource identification application 412 may receive a scan of a paper check, deposit slip, invoice, and/or the like that includes a technology resource string. Alternatively, the technology resource identification application 412 may receive another type of electronic file, such as a portable document format (PDF) document, that requires processing to extract the technology resource string from the file. Accordingly, the entity system 102 may extract the technology resource string from the image, scan, or other electronic file. In some cases, such as where the electronic file includes an image or scan of a physical instrument or a non-editable PDF, the technology resource identification application 412 may run an OCR process to identify the technology resource string included in the electronic file. Once the technology resource string is identified, the technology resource identification application 412 may identify a technology resource associated with the technology resource string, for example, using the technology resource data 420 stored in the data repository 416. The technology resource administration application 410 may then perform one or more requested actions with respect to the identified technology resource.

It should be understood that at least some of the steps described herein with respect to the technology resource identification application 412 may be performed at the user device 106, the employee device 108, or other device submitting the technology resource string to the entity system 102. For instance, the employee device 108 may perform an OCR process on a scan of a physical instrument and transmit the results of the scan to the entity system 102, where the technology resource identification application 412 uses the results of the OCR process to identify a technology resource.

FIG. 5 illustrates a block diagram 500 of the resource generator system 104, in accordance with some embodiments of the invention. As illustrated in FIG. 5, the resource generator system 104 may include a communication device 502; a processing device 504; and a memory device 506 having a technology resource generation application 510, a technology resource misread application 512, and a processing datastore 514 stored therein. As shown, the processing device 504 is operatively connected to and configured to control and cause the communication device 502 and the memory device 506 to perform one or more functions. In some embodiments, the technology resource generation application 510 and/or technology resource misread application 512 comprises computer-readable instructions or computer-readable code that when executed by the processing device 504 causes the processing device 504 to perform one or more functions. For example, the technology resource generation application 510 and/or technology resource misread application 512 may include computer-readable program code having one or more executable portions. It will be understood that the technology resource generation application 510 and/or technology resource misread application 512 may be executable to initiate, perform, complete, and/or facilitate one or more portions of any embodiments described and/or contemplated herein.

The communication device 502 may generally include a modem, server, transceiver, and/or other device for communicating with other devices on the network 101. In some embodiments, the communication device 502 may be a communication interface having one or more communication devices configured to communicate with one or more devices on the network 101, such as the entity system 102, the user device 106, and the employee device 108. As such, the communicative connection of the communication device 502 may be a wired or wireless connection similar to the implementation of the communication device 202 of the user device 106.

Referring to the resource generator system 104 illustrated in FIG. 5, the processing device 504 may generally refer to a device or combination of devices having circuitry used for implementing the communication and/or logic functions of the processing device 504. In this way, the processing device 504 may be configured similarly to the processing device 214 of the user device 106. Additionally, the processing device 504 may further include functionality to operate one or more software programs based on computer-readable instructions 508 thereof, which may be stored in the memory device 506, such as the technology resource generation application 510 and the technology resource misread application 512. The processing device 504 may be configured to use the network communication interface of the communication device 502 to transmit and/or receive data and/or commands to and/or from the other devices/systems connected to the network 101, similar to the processing device 214 of the user device 106.

The memory device 506 within the resource generator system 104 may generally refer to a device or combination of devices that store one or more forms of computer-readable media for storing data and/or computer-executable program instructions. For example, the memory device 506 may include any computer memory that provides an actual or virtual space to temporarily or permanently store data and/or commands provided to the processing device 504 when it carries out the functions described herein, similar to the memory device 216 of the user device.

The resource generator system 104 may further includes a data repository 516 comprising misread data 518 and technology resource evaluation data 520. The misread data 518 may include data on common electronic misreads that may occur between characters (e.g., "0" and "8", "5" and "6", "2" and "7", and/or the like). The misread data 518 may be provided to the resource generator system 104 and/or created by the resource generator system 104. For example, the resource generator system 104 may use identify characters that are commonly being misread over time (e.g., based on employee feedback) and add those misread characters to the misread data 518. The technology resource evaluation data 520 may include data on evaluating technology resources and their associated strings that are generated by the resource generator system 104, as described in further detail below.

In some embodiments, the technology resource generation application 510 may comprise computer-readable instructions associated with one or more technology resource generation steps, or the computer-readable instructions associated with one or more technology resource generation steps may be stored in the processing datastore 514. The technology resource generation application 510 may be embodied within the technology resource misread application 512, in some instances, or the technology resource misread application 512 may be embodied within the technology resource generation application 510, in some instances. In some embodiments, the technology resource generation application 510 comprises computer-readable instructions that, when executed by the processing device 504 to perform one or more functions and/or transmit control instructions to other components or devices to perform the one or more technology resource generation steps described herein.

These technology resource generation steps may include receiving instructions from the entity system 102 to generate a new technology resource. In some embodiments, the entity system 102 may transmit this request to the resource generator system 104 in response to receiving a request for a new technology resource from the user device 106 and/or the employee device 108. The instructions for the new technology resource may include personal information about the user for whom the technology resource is being generated, the type of technology resource, and so on. In some embodiments, the entity system 102 may transmit a request for one or more new technology resources to the resource generator system 104 without a request from a user and/or employee. For example, the entity system 102 may transmit a request for the resource generator system 104 to create a bulk number of technology resources or portions of technology resources, such as technology resource character strings that can be assigned to technology resources later. In response to receiving these instructions, the technology resource generation application 510 is configured to generate the new technology resource (or the requested portion of a new technology resource), which in various embodiments includes creating a new string of characters for the new technology resource. Once the new technology resource string is established, the technology resource string may subsequently be used to identify the technology resource by the entity associated with the entity system 102 and, in some cases, by other similar entities or institutions as well.

In some embodiments, the technology resource misread application 512 may comprise computer-readable instructions associated with one or more technology resource misread steps, or the computer-readable instructions associated with one or more technology resource misread steps may be stored in the processing datastore 514. The technology resource misread application 512 may be embodied within the technology resource generation application 510, in some instances, or the technology resource generation application 510 may be embodied within the technology resource misread application 512, in some instances. In some embodiments, the technology resource misread application 512 comprises computer-readable instructions that, when executed by the processing device 504, perform one or more functions and/or transmit control instructions to other components or devices to perform the one or more technology resource administration steps described herein.

These technology resource misread steps may include evaluating new technology resource strings generated by the technology resource generation application 510 to determine if a given new technology resource string is the same as any other existing technology resource string. The technology resource misread application 512 may do this, for example, by comparing the new technology resource string with the existing technology resource strings stored in the technology resource data 420 of the entity system 102 and/or the technology resource evaluation data 520 of the data repository 516. Additionally, the technology resource misread application 512 may determine whether a given new technology resource string has a certain likelihood of being electronically misread for another existing technology resource string. As an illustration, when an OCR process is performed on an image or other electronic document, some characters may be mistaken for other, similar characters. As described above, this may lead to an electronically read technology resource string being mistaken for another existing technology resource string based on misidentified characters. Thus, the technology resource misread application 512 may evaluate the new technology resource string against the existing technology resource strings to determine if there is a threshold likelihood of this happening. If there is, the technology resource misread application 512 instructs the technology resource generation application 510 to discard the given new technology resource string. In some embodiments, the technology resource misread application 512 also instructs the technology resource generation application 510 to generate another new character string for the technology resource, such as where the technology resource and technology resource string are being generated on demand in response to a request from a user device 106 and/or an employee device 108. In some embodiments, the technology resource misread application 512 may further similarly evaluate the existing technology resource strings against each other and flag, for the entity system 102, any existing string with a threshold likelihood of being mistaken for another existing technology resource string.

It should be understood that while in FIGS. 1, 4, and 5, the entity system 102 and the resource generator system 104 are shown as separate systems, the entity system 102 and the resource generator system 104 may, in some embodiments, be implemented partially or entirely as the same system. For example, the entity system 102 may be implemented as a series of networked servers that also host computer-readable code that performs the functions of the resource generator system 104 as described above and in further detail below.

These features will now be described with respect to the process flow 600 of FIG. 6 and the process flow 700 of FIG. 7. Starting first with the process flow 600 of FIG. 6, the resource generator system 104 receives a request for a new technology resource from the entity system 102, as indicated by block 602. For instance, the entity system 102 may receive a request from the user device 106 and/or the employee device 108 for a new technology resource for a new or existing user. In response, the entity system 102 may pass the request onto the resource generator system 104, which creates the new technology resource for the user. The technology resource may be tailored to the user based on user information, requested technology resource type requested, and so on. As another instance, the entity system 102 may provide a request for the resource generator system 104 to generate one or more technology resources or portions of technology resources, such as technology resource strings, without a request from a user device 106 or employee device 108. For example, the entity system 102 may request that the resource generator system 104 generate a bulk number of technology resource strings (e.g., 30,000 technology resource strings) and transmit the generated strings without a threshold likelihood of being electronically misread back to the entity system 102.

In response to the request, the resource generator system 104 generates a new technology resource string, as indicated by block 604. The new technology resource string may be a series of alphanumeric characters that uniquely identifies the new technology resource. In some embodiments, the resource generator system 104 may generate the new technology resource string randomly. For example, the resource generator system 104 may generate a random string of numbers having a predetermined number of digits as a new technology resource string.

As indicated by block 606, the resource generator system 104 may compare the new technology resource string to existing technology resource strings each associated with another technology resources. Each of the existing technology resource strings may be configured similarly to the new technology resource string. As an illustration, each existing technology resource string may be composed of a series of alphanumeric characters, such as a random number having a certain number of digits, and uniquely identify an existing technology resource held by a user at the entity. In some cases, the resource generator system 104 may make this comparison based on a list of the existing technology resource strings stored at the resource generator system 104 and/or the entity system 102.

As indicated by block 608, the resource generator system 104 may determine, based on the comparison, whether the new technology resource string is the same as an existing technology resource string. If the new string is the same as an existing technology resource string, the resource generator system 104 discards the string. In some embodiments, the resource generator system 104 may then generate another new technology resource string, as indicated by block 610. With the second new technology resource string, the resource generator system begins the process of evaluating this second new technology resource string at block 606. Alternatively, in some embodiments, the resource generator system 104 may instead end the process flow 600 at discarding the string or may restart the process flow 600 at block 604. For example, in cases where the entity system 102 requests that the resource generator system 104 generate a bulk number of technology resource character strings, the entity system 102 may only require the resource generator system 104 to provide the strings that successfully pass through the process flow 600 (e.g., reach block 614, described in further detail below) back to the entity system 102. As such, when the resource generator system 104 identifies a generated string that should be discarded, the resource generator system 104 may move on to generating the next technology resource string rather than creating a new technology resource string to replace it.

Otherwise, if the new technology resource string is not the same as any existing technology resource string, the resource generator system 104 determines, based on the comparison, whether the new technology resource string has a threshold number of matching character pairs with an existing technology resource string. To illustrate, the resource generator system 104 may evaluate the new technology resource string with respect to each existing technology resource string. Thus, for each existing technology resource string, the resource generator system 104 may pair each character of the new technology resource string with a character that occupies a corresponding position in the existing technology resource string. For instance, with technology resource strings that include certain number of digits, the resource generator system 104 may pair the first digit of the new technology resource string with the first digit of the existing technology resource string, the second digit of the new technology resource string with the second digit of the existing technology resource string, the third digit of the new technology resource string with the third digit of the existing technology resource string, and so on. The resource generator system 104 may then determine whether the characters of each character pair match. After identifying all the matching character pairs between the new technology resource and the existing technology resource, the resource generator system 104 may determine whether there are a threshold number of matching character pairs. In some embodiments, at least a portion of this analysis may be performed at block 606.

If there is not a threshold number of matching character pairs between the new technology resource and any existing technology resource, the resource generator system 104 may set the new technology resource string as the final string for the new technology resource, as indicated by block 614. For example, the resource generator system 104 may transmit the new technology resource string to the entity system 102, which stores the new technology resource string in the technology resource data 420 of the data repository 416 such that the new technology resource can be identified by the string in the future. Alternatively, in some embodiments, the resource generator system 104 may simply transmit the new technology resource string to the entity system 102 and/or store the new technology resource string (e.g., in the technology resource evaluation data 520 of the data repository 516), where the new technology resource string will be assigned to a technology resource at a later time.

Otherwise, if there is at least a threshold number of matching character pairs between the new technology resource string and one or more existing technology resource strings, the resource generator system 104 retrieves misread data, as indicated by block 616. The misread data may consist of character pairs with a certain likelihood of being mistaken for each other when read electronically, such as during an OCR process. For example, an OCR process may incorrectly identify a "0" as an "8" and vice versa, a "C" as an "0" and vice versa, a "2" as a "7" and vice versa, and so on. As such, the misread data may include these character pairs that may be commonly misread. In some cases, the resource generator system 104 may add to the misread data over time. To illustrate, the resource generator system 104 may identify new character pairs with a certain likelihood of being mistaken for each other based on feedback from employees who have had to fix issues with sets of characters being misread during the OCR process.

As indicated by block 618, the resource generator system 104 identifies one of the existing technology resource strings having at least a threshold number of matching character pairs with the new technology resource string (e.g., identified at block 612). For this existing technology resource string, the resource generator system 104 determines, using the misread data, whether each non-matching pair of characters between the new technology resource string and the existing technology resource string is a pair of commonly misread characters. Based on this, the resource generator system 104 further determines whether the new technology resource string and the existing technology resource string include any pairs of commonly misread characters, as indicated by block 620.

If the new technology resource string and the existing technology resource string do not include any pairs of commonly misread characters, the resource generator system 104 determines whether there is another existing technology resource string having a threshold number of matching character pairs with the new technology resource string that has not yet been evaluated for commonly misread pairs, as indicated by block 626. If there is another existing technology resource string with a threshold number of matching character pairs that has not been evaluated for commonly misread pairs, the resource generator system 104 identifies that existing technology resource string as the next string for evaluation at block 618. Otherwise, if all existing technology resource strings with a threshold number of matching character pairs have been evaluated, the resource generator system sets the new technology resource string as the final string for the technology resource, or stores the new technology resource string to assign to a technology resource at a later time, as indicated by block 614. Alternatively, in some embodiments, the process flow 600 may not include block 620 and may instead move directly to the evaluations performed at blocks 622 and 624 and described below.

On the other hand, if the existing technology resource string under evaluation includes one or more pairs of misread characters with the new technology resource string, the resource generator system 104 determines the number of matching character pairs and the number of commonly misread character pairs between the new technology resource string and the existing technology resource string, as indicated by block 622. As indicated by block 624, the resource generator system 104 then determines whether the combination of matching pairs and misread pairs is below a threshold combination level. For instance, in some embodiments, the resource generator system 104 may weight the number of matching character pairs and the number of commonly misread character pairs. As an example, the resource generator system 104 may weight the matching character pairs more highly than the number of commonly misread character pairs, given that the commonly misread character pairs are associated with a likelihood, but not a certainty, of being misread for each other. Then, the resource generator system 104 may determine whether the combination of the weighted number of matching character pairs and the weighted number of commonly misread character pairs reaches a threshold combination number. As another instance, in some embodiments, the resource generator system 104 may add the number of matching character pairs and misread character pairs and determine whether this number meets a threshold combination number.

In some cases, the resource generator system 104 may also take other factors into consideration when determining whether the combination of matching and commonly misread character pairs is below the threshold. To illustrate, the resource generator system 104 may also determine whether the non-matching pairs between the new technology resource string and the existing technology resource string include one or more pairs that have a low likelihood of being electronically misread (e.g., "8" and "7", "3" and "1", and so on). If the new technology resource string and the existing technology resource string include a certain number of non-matching pairs with a low likelihood of electronic misread (e.g., one or more, three or more, and so on), the resource generator system 104 may determine that the combination of pairs automatically falls below the threshold combination. Alternatively, the resource generator system 104 may weight the non-matching pairs with a low likelihood of electronic misread and factor those into the combination of weighted matching character pairs and the weighted commonly misread character pairs such that the weight assigned to the non-matching pairs with a low likelihood of electronic misread lowers the overall combination number.

If the combination of matching, commonly misread, and, in some cases as discussed above, not commonly misread character pairs falls below the threshold combination, the resource generator system 104 determines that there is a low enough likelihood that that the new technology resource string will be electronically misread as the existing technology resource string being evaluated. As such, the resource generator system 104 determines whether there is another existing technology resource string with a threshold number of matching character pairs that has not been evaluated for commonly misread pairs, as indicated by block 626. On the other hand, if the combination of pairs reaches the threshold combination, the resource generator system 104 determines that there is a high enough likelihood of an electronic misread occurring between the new technology resource string and the existing technology resource string being evaluated that the new technology resource string should not be used. The resource generator system 104 thus discards the new technology resource string and, in some embodiments as discussed above, generates another new technology resource string for the new technology resource, as indicated by block 610. If the resource generator system 104 generates a replacement technology resource string, the resource generator system 104 then evaluates this second new technology resource string starting with block 606.

Moving next to the process flow 700 of FIG. 7, in some embodiments, the resource generator system 104 may additionally evaluate the existing technology resource strings to determine if any given existing technology resource string has an evaluated likelihood of being misread as another existing technology resource string in the future. Accordingly, as indicated by block 702, the resource generator system 104 retrieves an existing technology resource string. As indicated by block 704, the resource generator system 104 then compares the existing technology resource string to the remaining existing technology resource strings. As indicated by block 706, the resource generator system 104 determines, based on the comparison, whether the selected existing technology resource string has a threshold number of matching character pairs with one or more of the remaining existing technology resource strings. In some embodiments, blocks 704 and 706 of the process flow 700 may be implemented similarly to blocks 606 and 612 of the process flow 600 of FIG. 6.

If there is not a threshold number of matching character pairs between the existing technology resource string and any other existing technology resource string, the resource generator system 104 may determine that the current existing technology resource string has a low enough likelihood of being electronically misread for another existing technology resource string that the current string does not need, for example, to be flagged for corrective actions. As such, the resource generator system 104 then determines if there is another existing technology resource string that the resource generator system 104 has not yet evaluated with respect to potential electronic misreads, as indicated by block 722. If there is at least one more existing technology resource string that the resource generator system 104 has not evaluated, the resource generator system 104 may retrieve the next technology resource string, as indicated by block 724. Next, the resource generator system 104 may evaluate this newly selected existing technology resource string, starting with block 704.

For instance, the resource generator system 104 may list all of the existing technology resource strings and sequentially move down the list. As such, the evaluation process (e.g., blocks 704-720) will have already been performed for all existing technology resource strings before the current string being evaluated and should still be performed for all existing technology resource strings after the current string being evaluated. Thus, if there are additional existing technology resource strings on the list, the resource generator system 104 may retrieve the next existing technology resource string on the list at block 724. Otherwise, if the resource generator system 104 determines that all existing technology resource strings have been evaluated, the resource generator system 104 may finish the process flow 700, as indicated by block 726.

On the other hand, if there is at least a threshold number of matching character pairs between the current existing technology resource string and one or more of the remaining existing technology resource strings, the resource generator system 104 retrieves misread data, as indicated by block 708. As indicated by block 710, the resource generator system 104 then identifies one of the remaining existing technology resource strings having at least a threshold number of matching character pairs with the current existing technology resource string (e.g., determined at block 706). As indicated by block 712, the resource generator system 104 next determines whether the current existing technology resource string and the selected remaining string include any pairs of commonly misread characters. In some embodiments, blocks 708, 710, and 712 may be implemented similarly to blocks 616, 618, and 620 of the process flow 600. Alternatively, similar to the process flow 600, in some embodiments, the process flow 700 may not include block 712 and may instead move directly to the determination made at block 714.

If the current existing technology resource string and the selected remaining string do not include any pairs of commonly misread characters, the resource generator system 104 may determine that there is a low enough likelihood of electronic misread between the two strings that they do not need to be flagged with respect to each other. As such, as indicated by block 720, the resource generator system 104 determines if there is another remaining existing technology resource string with a threshold number of matching character pairs with the current existing technology resource string (e.g., determined at block 706) that has not been evaluated for commonly misread pairs. If there is another remaining existing string that has not been evaluated for commonly misread pairs, the resource generator system 104 selects that remaining existing string as the next string for evaluation with the current existing string at block 710.

Otherwise, if all remaining existing strings with a threshold number of matching character pairs with the current existing string have been evaluated, the resource generator system determines that the current existing string has a low enough likelihood for electronic misread that the current existing string does not need to be flagged for a potential electronic misread at all. Thus, the resource generator system 104 moves on to determining whether there is another existing technology resource string that the resource generator system 104 has not yet evaluated with respect to potential electronic misreads, as indicated by block 722.

On the other hand, if the current existing technology resource string does include one or more pairs of commonly misread characters with the selected remaining string, the resource generator system 104 determines the number of matching character pairs and the number of commonly misread character pairs between the existing technology resource string and the selected remaining string, as indicated by block 714. As indicated by block 716, the resource generator system 104 then determines whether the combination of matching pairs and misread pairs is below a threshold combination level. In some embodiments, blocks 714 and 716 may be implemented similarly to blocks 622 and 624 of the process flow 600.

If the combination of pairs falls below the threshold combination, the resource generator system 104 may determine that there is a low enough likelihood of electronic misread between the two strings that they do not need to be flagged with respect to each other. Therefore, the resource generator system 104 determines whether there is another remaining existing string with a threshold number of matching character pairs with the current existing string that has not been evaluated for commonly misread pairs, as indicated by block 720. Otherwise, if the combination of pairs reaches the threshold combination, the resource generator system 104 determines that there is a high enough likelihood of an electronic misread between the current existing string and the selected remaining string that one or more corrective actions should be taken. As such, the resource generator system 104 may flag the current existing technology resource string and the selected remaining string for the entity system 102. For example, once the resource generator system 104 has evaluated the current existing technology resource string with respect to all of the remaining existing technology resource strings, the resource generator system 104 may transmit to the entity system 102 the current string and any of the remaining strings that the resource generator system 104 has determined may be subject to a potential future electronic misread based on the process flow 700. Based on the flagging of the strings, the entity system 102 may implement one or more corrective actions.

For instance, when an OCR process performed on an electronic file identifies a technology resource string as being the current existing technology resource string or one of the identified potential misread strings, the entity system 102 may enforce a manual review of the OCR result by an employee. Alternatively, the entity system 102 may transmit the electronic file with the technology resource string (e.g., scan of paper document with the technology resource string) to an employee, such as the employee associated with the employee device 108, or notify the employee in possession of the paper document from which the electronic file was created. The entity system 102 may then require the employee to manually enter the technology resource string shown on the electronic file or paper document instead of using the OCR results. Referring back to the process flow 700, after flagging the current existing technology resource string for the entity system, the resource generator system 104 continues the process flow 700 by determining whether there is another remaining existing technology resource string with a threshold number of matching character pairs with the current string that has not been evaluated for commonly misread pairs, as indicated by block 720.

It should be understood that the process flows 600 and 700 are intended to be exemplary and that other processes may be used to generate resource identification strings to avoid electronic misreads and evaluate existing resource identification strings for potential future misreads. For instance, in some embodiments, the resource generator system 104 may determine whether a first technology resource string and a second technology resource string being evaluated with respect to the first string have at least one non-matching pair of characters that is also not a pair of characters that is commonly misread. If the technology resource string and the other technology resource string being evaluated have at least one such pair, the resource generator system 104 may automatically move on to the next technology resource string to be evaluated with respect to the first string.

As another example, in some embodiments, the resource generator system 104 may keep track of which existing technology resource strings have been evaluated with respect to each other during the process flow 700 of FIG. 7 such that the resource generator system 104 does not duplicate evaluations. To illustrate, if the entity system 102 is storing "String A", "String B", and "String C", the resource generator system 104 may perform the process flow 700 starting with String A. Thus, as part of the process flow 700, the resource generator system 700 may compare String A to String B to determine the likelihood of an electronic misread and compare String A to String C to determine the likelihood of an electronic misread. After finishing with String A, the resource generator system 104 may identify String B as the next technology resource string for evaluation (e.g., at block 724). However, the resource generator system 104 may determine that String B and String A have already been compared and thus skip to comparing String B to String C to determine the likelihood of an electronic misread. Once the resource generator system 104 has finished with String B, the resource generator system 104 may identify String C as the next technology resource string for evaluation, but because String C has already been compared to String A and String B, the resource generator system 104 may instead finish the process flow 700.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the continuous authentication and encryption processes and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive of, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for generating resource identification strings to avoid electronic misreads:
 a memory device with computer-readable program code stored thereon;
 a communication device; and
 a processing device operatively coupled to the memory device and communication device, wherein the processing device is configured to execute the computer-readable program code to:
  receive a request for a new technology resource;
  generate a new technology resource string of characters, each character having a position in the new technology resource string, wherein generating the new technology resource string comprises generating a random string of numbers, the string having a predetermined number of digits;
  compare the new technology resource string to a plurality of existing technology resource strings, each existing technology resource string comprising a string of characters, each character having a position in the existing technology resource string, wherein each existing technology resource string is associated with an existing technology resource, wherein one of the existing technology resource strings are identified by optical character recognition;
  determine whether the new technology resource string is the same as an existing technology resource string;
  in response to determining that the new technology resource string is not the same as any existing technology resource string, for each existing technology resource string:
   pair each character of the new technology resource string with a character in a corresponding position in the existing technology resource string,
   determine whether the characters of each pair match,
   identify non-matching pairs of characters between the new technology resource string and the existing technology resource string, and
   determine whether the new technology resource string has at least a threshold number of matching character pairs with the existing technology resource string;
   for each non-matching pair of characters between the new technology resource string and the existing technology resource string, determine whether the characters of the non-matching pair are commonly misread characters, and
   determine whether the new technology resource string has at least a threshold combination of matching character pairs and non-matching pairs with commonly misread characters with the existing technology resource string; and
  in response to determining that the new technology resource string has at least a threshold combination of matching character pairs and non-matching pairs with commonly misread characters with an existing technology resource string, discard the new technology resource string and generate a second new technology resource string of characters.

2. The system of claim 1, wherein a pair of commonly misread characters comprises two characters with a likelihood of being mistaken for each other during an optical character recognition process.

3. The system of claim 1, wherein determining whether the new technology resource string has at least a threshold combination of matching character pairs and non-matching pairs with commonly misread characters with the existing technology resource string comprises:
 determining a number of matching character pairs between the new technology resource string and the existing technology resource string;
 determining a number of non-matching pairs with commonly misread characters between the new technology resource string and the existing technology resource string;
 weighting the number of matching character pairs and weighting the number of commonly misread alphanumeric character pairs; and
 determining whether a combination of the weighted number of matching character pairs and the weighted number of non-matching pairs with commonly misread characters reaches the threshold combination.

4. The system of claim 1, wherein the processing device is further configured to:
 compare the second new technology resource string to the plurality of existing technology resource strings;
 determine whether the second new technology resource string is the same as an existing technology resource string;
 in response to determining that the second new technology resource string is not the same as any technology resource string, for each existing technology resource string:
  pair each character of the second new technology resource string with a character in a corresponding position in the existing technology resource string,
  determine whether the characters of each pair match, and
  determine whether the new technology resource string has at least a threshold number of matching character pairs with the existing technology resource string;
 in response to determining that the second new technology resource string has at least a threshold number of matching character pairs with one or more existing technology resource strings, for at least one of the existing technology resource strings:
  for each non-matching pair of characters between the second new technology resource string and the existing technology resource string, determine whether the characters of the non-matching pair are commonly misread characters, and
  determine whether the second new technology resource string has at least the threshold combination of matching character pairs and non-matching pairs with commonly misread characters with the existing technology resource string; and
 in response to determining that the second new technology resource string does not have the threshold combination of matching character pairs and non-matching pairs with commonly misread characters with any existing technology resource string, set the second new technology resource string as a final technology resource string for the new technology resource.

5. The system of claim 1, wherein the processing device is further configured to:
 identify a given existing technology resource string from the plurality of existing technology resource strings;
 for each remaining existing technology resource string:

pair each character of the given existing technology resource string with a character in a corresponding position in the existing technology resource string, determine whether the characters of each pair match, and determine whether the given existing technology resource string has at least a threshold number of matching character pairs with the existing technology resource string; and in response to determining that the given existing technology resource string has at least a threshold number of matching character pairs with one or more remaining existing technology resource strings, for each of the one or more remaining existing technology resource strings:

for each non-matching pair of characters between the given existing technology resource string and the remaining existing technology resource string, determine whether the characters of the non-matching pair are commonly misread characters, and determine whether the given existing technology resource string has at least a threshold combination of matching character pairs and non-matching pairs with commonly misread characters with the remaining existing technology resource string; and in response to determining that the given existing technology resource string has at least a threshold combination of matching character pairs and non-matching pairs with commonly misread characters with one or more existing technology resource strings, flag the technology resource associated with the given existing technology resource string.

6. The system of claim 5, wherein identifying the given existing technology resource string from the plurality of existing technology resource strings comprises identifying the given existing technology resource string as a next existing technology resource string on a list comprising the plurality of existing technology resource strings;

wherein existing technology resource strings listed before the given existing technology resource string have already been subject to a determination of whether to be flagged.

7. The system of claim 5, wherein flagging the technology resource associated with the given existing technology resource string comprises requiring at least one of manual entry of the given existing technology resource string or requiring manual review of optical character recognition that produces the given existing technology resource string.

8. A computer-implemented method for generating resource identification strings to avoid electronic misreads, the method comprising:

receiving a request for a new technology resource;

generating a new technology resource string of characters, each character having a position in the new technology resource string, wherein generating the new technology resource string comprises generating a random string of numbers, the string having a predetermined number of digits;

comparing the new technology resource string to a plurality of existing technology resource strings, each existing technology resource string comprising a string of characters, each character having a position in the existing technology resource string, wherein each existing technology resource string is associated with an existing technology resource, wherein one of the existing technology resource strings are identified by optical character recognition;

determining whether the new technology resource string is the same as an existing technology resource string;

in response to determining that the new technology resource string is not the same as any existing technology resource string, for each existing technology resource string:

pairing each character of the new technology resource string with a character in a corresponding position in the existing technology resource string, determining whether the characters of each pair match, identifying non-matching pairs of characters between the new technology resource string and the existing technology resource string, and determining whether the new technology resource string has at least a threshold number of matching character pairs with the existing technology resource string;

for each non-matching pair of characters between the new technology resource string and the existing technology resource string, determining whether the characters of the non-matching pair are commonly misread characters, and determining whether the new technology resource string has at least a threshold combination of matching character pairs and non-matching pairs with commonly misread characters with the existing technology resource string; and in response to determining that the new technology resource string has at least a threshold combination of matching character pairs and non-matching pairs with commonly misread characters with an existing technology resource string, discarding the new technology resource string and generating a second new technology resource string of characters.

9. The computer-implemented method of claim 8, wherein a pair of commonly misread characters comprises two characters with a likelihood of being mistaken for each other during an optical character recognition process.

10. The computer-implemented method of claim 8, wherein determining whether the new technology resource string has at least a threshold combination of matching character pairs and non-matching pairs with commonly misread characters with the existing technology resource string comprises:

determining a number of matching character pairs between the new technology resource string and the existing technology resource string;

determining a number of non-matching pairs with commonly misread characters between the new technology resource string and the existing technology resource string;

weighting the number of matching character pairs and weighting the number of commonly misread alphanumeric character pairs; and determining whether a combination of the weighted number of matching character pairs and the weighted number of non-matching pairs with commonly misread characters reaches the threshold combination.

11. The computer-implemented method of claim 8, further comprising:

comparing the second new technology resource string to the plurality of existing technology resource strings;

determining whether the second new technology resource string is the same as an existing technology resource string;

in response to determining that the second new technology resource string is not the same as any technology resource string, for each existing technology resource string:
  pairing each character of the second new technology resource string with a character in a corresponding position in the existing technology resource string,
  determining whether the characters of each pair match, and
  determining whether the new technology resource string has at least a threshold number of matching character pairs with the existing technology resource string;
in response to determining that the second new technology resource string has at least a threshold number of matching character pairs with one or more existing technology resource strings, for at least one of the existing technology resource strings:
  for each non-matching pair of characters between the second new technology resource string and the existing technology resource string, determining whether the characters of the non-matching pair are commonly misread characters, and
  determining whether the second new technology resource string has at least the threshold combination of matching character pairs and non-matching pairs with commonly misread characters with the existing technology resource string; and
in response to determining that the second new technology resource string does not have the threshold combination of matching character pairs and non-matching pairs with commonly misread characters with any existing technology resource string, setting the second new technology resource string as a final technology resource string for the new technology resource.

12. The computer-implemented method of claim 8, further comprising:
identifying a given existing technology resource string from the plurality of existing technology resource strings;
for each remaining existing technology resource string:
  pairing each character of the given existing technology resource string with a character in a corresponding position in the existing technology resource string,
  determining whether the characters of each pair match, and
  determining whether the given existing technology resource string has at least a threshold number of matching character pairs with the existing technology resource string; and
in response to determining that the given existing technology resource string has at least a threshold number of matching character pairs with one or more remaining existing technology resource strings, for each of the one or more remaining existing technology resource strings:
  for each non-matching pair of characters between the given existing technology resource string and the remaining existing technology resource string, determining whether the characters of the non-matching pair are commonly misread characters, and
  determining whether the given existing technology resource string has at least a threshold combination of matching character pairs and non-matching pairs with commonly misread characters with the remaining existing technology resource string; and
in response to determining that the given existing technology resource string has at least a threshold combination of matching character pairs and non-matching pairs with commonly misread characters with one or more existing technology resource strings, flagging the technology resource associated with the given existing technology resource string.

13. The computer-implemented method of claim 12, wherein identifying the given existing technology resource string from the plurality of existing technology resource strings comprises identifying the given existing technology resource string as a next existing technology resource string on a list comprising the plurality of existing technology resource strings;
wherein existing technology resource strings listed before the given existing technology resource string have already been subject to a determination of whether to be flagged.

14. The computer-implemented method of claim 12, wherein flagging the technology resource associated with the given existing technology resource string comprises requiring at least one of manual entry of the given existing technology resource string or requiring manual review of optical character recognition that produces the given existing technology resource string.

15. A computer program product for generating resource identification strings to avoid electronic misreads with at least one non-transitory computer-readable medium having computer-readable program code portions embodied therein, the computer-readable program code portions comprising:
an executable portion configured for receiving a request for a new technology resource;
an executable portion for generating a new technology resource string of characters, each character having a position in the new technology resource string, wherein generating the new technology resource string comprises generating a random string of numbers, the string having a predetermined number of digits;
an executable portion for comparing the new technology resource string to a plurality of existing technology resource strings, each existing technology resource string comprising a string of characters, each character having a position in the existing technology resource string, wherein each existing technology resource string is associated with an existing technology resource, wherein one of the existing technology resource strings are identified by optical character recognition;
an executable portion for determining whether the new technology resource string is the same as an existing technology resource string;
an executable portion for, in response to determining that the new technology resource string is not the same as any existing technology resource string, for each existing technology resource string:
  pairing each character of the new technology resource string with a character in a corresponding position in the existing technology resource string,
  determining whether the characters of each pair match,
  identifying non-matching pairs of characters between the new technology resource string and the existing technology resource string, and
  determining whether the new technology resource string has at least a threshold number of matching character pairs with the existing technology resource string;

for each non-matching pair of characters between the new technology resource string and the existing technology resource string, determining whether the characters of the non-matching pair are commonly misread characters, and determining whether the new technology resource string has at least a threshold combination of matching character pairs and non-matching pairs with commonly misread characters with the existing technology resource string; and an executable portion for, in response to determining that the new technology resource string has at least a threshold combination of matching character pairs and non-matching pairs with commonly misread characters with an existing technology resource string, discarding the new technology resource string and generating a second new technology resource string of characters.

16. The computer-program product of claim 15, wherein a pair of commonly misread characters comprises two characters with a likelihood of being mistaken for each other during an optical character recognition process.

17. The computer-program product of claim 15, wherein the computer-readable program code portions further comprise:

an executable portion configured for comparing the second technology resource string to the plurality of existing technology resource strings;

an executable portion configured for determining whether the second new technology resource string is the same as an existing technology resource string;

an executable portion configured for, in response to determining that the second new technology resource string is not the same as any technology resource string, for each existing technology resource string:

pairing each character of the second new technology resource string with a character in a corresponding position in the existing technology resource string, determining whether the characters of each pair match, and determining whether the new technology resource string has at least a threshold number of matching character pairs with the existing technology resource string;

an executable portion configured for, in response to determine that the second new technology resource string has at least a threshold number of matching character pairs with one or more existing technology resource strings, for at least one of the existing technology resource strings:

for each non-matching pair of characters between the second new technology resource string and the existing technology resource string, determining whether the characters of the non-matching pair are commonly misread characters, and determining whether the second new technology resource string has at least the threshold combination of matching character pairs and non-matching pairs with commonly misread characters with the existing technology resource string; and an executable portion configured for, in response to determining that the second new technology resource string does not have the threshold combination of matching character pairs and non-matching pairs with commonly misread characters with any existing technology resource string, setting the second new technology resource string as a final technology resource string for the new technology resource.

18. The computer-program product of claim 15, wherein the computer-readable program code portions further comprise:

an executable portion configured for identifying a given existing technology resource string from the plurality of existing technology resource strings;

an executable portion configured for, for each remaining existing technology resource string:

pairing each character of the given existing technology resource string with a character in a corresponding position in the existing technology resource string, determining whether the characters of each pair match, and determining whether the given existing technology resource string has at least a threshold number of matching character pairs with the existing technology resource string; and an executable portion configured for, in response to determining that the given existing technology resource string has at least a threshold number of matching character pairs with one or more remaining existing technology resource strings, for each of the one or more remaining existing technology resource strings:

for each non-matching pair of characters between the given existing technology resource string and the remaining existing technology resource string, determining whether the characters of the non-matching pair are commonly misread characters, and determining whether the given existing technology resource string has at least a threshold combination of matching character pairs and non-matching pairs with commonly misread characters with the remaining existing technology resource string; and an executable portion configured for, in response to determining that the given existing technology resource string has at least a threshold combination of matching character pairs and non-matching pairs with commonly misread characters pairs with one or more existing technology resource strings, flagging the technology resource associated with the given existing technology resource string.

\* \* \* \* \*